United States Patent [19]
Sakai et al.

[11] Patent Number: 5,542,023
[45] Date of Patent: Jul. 30, 1996

[54] MULTI-MEDIA REPRODUCTION PROCESSING APPARATUS

[75] Inventors: Hiroyuki Sakai; Takahiro Yamada; Masataka Musya; Yuji Kimura, all of Yokohama, Japan

[73] Assignee: Hitachi, Ltd., Tokyo, Japan

[21] Appl. No.: 894,008

[22] Filed: Jun. 4, 1992

[30] Foreign Application Priority Data

Jun. 5, 1991 [JP] Japan .................................. 3-134080
Jun. 18, 1991 [JP] Japan .................................. 3-145092

[51] Int. Cl.⁶ .................................................. G06F 17/30
[52] U.S. Cl. .................................................. 395/154
[58] Field of Search .................................. 395/153, 154, 395/155, 161; 345/115, 117

[56] References Cited

U.S. PATENT DOCUMENTS

| | | | |
|---|---|---|---|
| 5,206,929 | 4/1993 | Langford et al. | 395/159 |
| 5,245,322 | 9/1993 | Dimwiddie, Jr. et al. | 345/149 |
| 5,274,758 | 12/1993 | Beitel et al. | 395/154 |
| 5,307,456 | 4/1994 | Mackay | 395/154 |
| 5,412,774 | 5/1995 | Agrawal et al. | 395/157 |
| 5,414,808 | 5/1995 | Williams | 395/154 |

OTHER PUBLICATIONS

Multimedia Headache: Who's On First?, Electronics Dec. 1990, pp. 53–55.
A Guide to Energing Optical Technologies, Database, Oct. 1990, pp. 116–119.

*Primary Examiner*—Phu K. Nguyen
*Attorney, Agent, or Firm*—Antonelli, Terry, Stout & Kraus

[57] ABSTRACT

A storage medium stores image data, audio data and processing programs having different reproduction modes, such as recording systems or data format are stored as stream data. When a specific data is to be read out from the stream data, a mode discrimination data is separated from the data to generate mode information indicative of the recording system of the data and the algorithm for reproduction of the data on the basis of the separated mode discrimination data. Based on the mode information, switching of mode is performed to reproduce image data or audio data of one of the reproduction modes among the data recorded with a plurality of mutually distinct reproduction modes, by the processing program. If the processing program is common for reproduction of other data recorded on the storage medium, such processing program is previously stored for use in common for accelerating taking up of the reproduction processing apparatus.

58 Claims, 27 Drawing Sheets

MULTI-MEDIA REPRODUCTION PROCESSING APPARATUS

BACKGROUND OF THE INVENTION

The present invention relates to a multi-media reproduction processing apparatus for reproducing data on a recording medium. The reproduced data is stream data including image information, such as a motion picture, still image, audio information, other processing programs and so forth. Particularly, the invention relates to a multi-media reproduction processing apparatus suitable for high speed reproduction of data on a plurality of recording mediums having different recording systems or data formats.

Conventionally, a system for reproducing image and audio data recorded on a CD-ROM (compact disc-Read Only Memory) has been disclosed in "Nikkei New Medium, Forefront Technology Report (1)", Nikkei McGraw-Hill, May 18, 1987, pages 50–57.

The construction of the conventional multi-media reproduction processing apparatus will be discussed in reference to FIG. 2.

In FIG. 2, the reference numeral 1 denotes data input unit, such as a disc drive or so forth. The reference numeral 2 denotes input data, 3 denotes data separation device for separating image information, audio information and processing program. The reference numeral 4 denotes image data, 5 denotes audio data, 6 denotes a processing program, 7 denotes an image data processing section, 8 denotes an audio data processing section, 9 denotes a processor section, and 10 denotes an input device which transmits commands for initiation of operation. The reference numeral 11 denotes a control signal from the input device 10, 12 denotes an image control signal output from the processor section 9, 13 denotes an audio control signal output from the processor section 9, 14 denotes an image frame data, 15 denotes an image output control section, 16 denotes a display signal output from the image output control section 15, 17 denotes a display monitor, 18 denotes audio data output from the audio data processing section 8, 19 denotes audio output section, 20 denotes an analog audio signal output from the audio output section 19, and 21 denotes a speaker.

Next, operation of the conventional multimedia reproduction processing apparatus will be discussed in reference to FIG. 2.

Data recording on the CD-ROM is read out by the disc drive 1 and input to the data separation device 3 as the input data 2. The data separation device 3 separates and outputs the image data 4, the audio data 5 and the processing program 6. The image data 4 is digital data, in which still image data or motion picture data is compressed using certain algorithms. The image data processing section 7 performs data expansion to generate frame data 14 for a complete one frame image. In the image output control section 15, the frame data 14 is converted into a display signal for displaying the frame data on the display screen of the display monitor 17. By this, the image data 4 recorded on the CD-ROM can be displayed on the display monitor 17 as the still image or the motion picture.

On the other hand, the audio data 5 is also digital data derived by data compression using a certain algorithm. The audio data 5 is expanded by the audio data processing section 8 and then output as the complete audio data 18. The audio output section 19 converts the digital signal into an analog signal and outputs the converted signal to the speaker 21. Through the process set forth above, the audio data 5 recorded on the CD-ROM can be reproduced as an acoustic output through the speaker 21.

The processing program is adapted to manage and control the image data 4 and the audio data 5 recorded on the CD-ROM. In response to operation of the input device 10 by the user, the control signal 11 is supplied to the processor section 9. The processor 9 controls the image data processing section 7 and the audio data processing section 8 by control signals 12 and 13 for controlling image and audio processing, on the basis of the input processing program. By this, an operation according to the processing program recorded on the CD-ROM can be performed.

In the multi-media reproduction processing apparatus as set forth above, only CD-ROMs recorded in a specific recording system or data format can be reproduced.

Namely, since the still image or motion picture data and the audio data are recorded as digital data through data compression employing a specific algorithm, on the CD-ROM, a dedicated reproduction system is required for expansion of the compressed digital data. Therefore, the digital data compressed employing a different algorithm cannot possibly be reproduced because of differences in the reproduction modes. Also, the CD-ROM recorded in the different reproduction mode generally has different data format.

On the other hand, in the disclosure of Japanese Unexamined Patent Publication No. JP-A-2-220584, the CD-ROM as a recording medium records, as stream data, encoded image information in which data is compressed and encoded, the audio data, a control program defining an algorithm for expansion and decoding of the compressed and encoded data, and an application program to be used by a microprocessor incorporated in the apparatus. In FIG. 2, before the processor 9 reads out the image and the audio data from the CD-ROM and outputs the data to the display monitor 17 and the speaker 21, the application program to be used by the processor 9 is read out from the CD-ROM.

In one CD-ROM, a plurality of the stream data of the image and audio, the control programs and application programs are recorded. The control program and the application program are differentiated with respect to each of the stream data.

In the above-mentioned description, the reproducing processing apparatus does not determine whether the control program and the application program are the same kind of program or different kinds of programs in relation to those processed immediately before. Therefore, with respect to every stream data of the image and audio, the processing programs on the CD-ROM have to be read out. In such case, due to a seek time of CD-ROM and a restriction of a reading out speed (150 Kbit/sec.), it takes a relatively long period of time for initiation of operation of the reproduction processing apparatus upon starting process.

SUMMARY OF THE INVENTION

It is an object of the present invention to provide a multi-media reproduction processing apparatus capable of discriminating algorithms for data compression of stream data containing an image, such as a motion picture, a still image, an audio signal and a processing program and so forth, and a recording system of a data format and that can perform reproduction of information from various recording mediums recorded by different recording systems, with a single reproducing system.

Another object of the present invention is to provide a multi-media reproduction processing apparatus which previously stores a processing program to be used in common in processing of a plurality of stream data and realizes quick take-up of the reproduction processing apparatus using such a common processing program.

According to one aspect of an embodiment of the invention, there is provided a multi-media reproduction processing apparatus comprising a data supply device to which a storage medium is mounted and data is read out from the storage medium, a data separation device for separating mode discrimination data identifying the reproduction mode data from the data supply device, a mode discrimination device for discriminating mode on the basis of the mode discrimination data, a mode switching device for switching reproduction modes depending upon the mode information, and at least one reproduction device having at least two reproduction modes.

The reproduction device can reproduce at least one of audio data and image data.

The reproduction device has a mode control section for performing mode control depending upon the mode information, and a data processing section for performing data processing with respect to at least one reproduction mode.

The multi-media reproduction processing apparatus further includes an output control section for performing output control of the reproduction data from the reproduction device and a display device for displaying the reproduction data.

It is possible to further provide a data processing device for controlling the reproduction device and an input device for entering commands for the data processing device.

On the other hand, in the multi-media reproduction processing apparatus, instead of outputting the mode information from the mode discrimination device, a mode supply section for outputting the mode information may be provided in the input device for inputting the mode information to the data processing section from the input device.

With the above-mentioned first aspect of the embodiment of the invention, by reading a CD-ROM driven by a disc drive, separating the mode discrimination data and performing mode discrimination, the conventionally used algorithm of data compression for CD-ROMs and reproduction formats can be identified to output the mode information. On the other hand, the mode switching section provided in the image data processing section and the audio data processing section receive the mode information and switch the reproduction mode and the mode control of respective processing section to the mode recognized in the mode discrimination section. By this, in the multi-media reproduction processing apparatus, the data of the CD-ROM with different data format and data compression algorithm can be reproduced.

On the other hand, it is possible to make the discrimination in the processor section without providing the mode discrimination section, and recognition of the reproduction mode similar to that described above can be done by outputting the mode information from the processor section.

In addition, it is possible to output the mode information from the input device to control the reproduction mode of the image data processing section and the audio data processing section.

It is noted that, as the recording system for the CD-ROM, there have been proposed several recording systems. These recording systems employ specific algorithms in reproduction of still image data, motion picture data, audio data, and so forth. The detailed recording system is described in "CD Utility Technology", Television Society Paper, Vol. 43, No. 6, Pages 587 to 593, the recording system is recited as CD-ROM XA and CD-I.

According to the second aspect of the embodiment of the invention, there is provided a multimedia reproduction processing apparatus comprising a data supply device inputting stream data, a data processing device for performing reproduction process for the stream data, a storage device for storing the processing program to be used for the reproduction process of the stream data. The data processing device includes a discrimination device for judging whether the processing program is present in the storage means or not. When the processing program is not present, the processing program is transferred from the data supplying device to the storage device.

It is possible to further provide an output device for outputting processed data for reproduction in the data processing device.

The data supplying device has a drive device to which an external storage medium is mounted so as to read and write the data thereon. The driver device may be an optical disc driver when the external storage medium is an optical disc.

Also, it is possible to connect the data supply device and the data processing device through a communication network. The storage device may also be a read only storage device to store at least one of the stream data and the processing program.

Furthermore, the data processing device may have an internal storage device, a magnetic disc device, a ROM employing a semiconductor storage element, a RAM employing a semiconductor storage element, a cache memory, or so forth. These can be used as the storage device.

In the above-mentioned second aspect of the embodiment of the invention, the storage device can previously store the processing program. When the stream data is to be processed by the same type of the processing program, by initiating the operation of the data processing device using the stored processing program, the multi-media reproduction processing apparatus can be started up at a higher speed than in starting by reading the processing program from the driver device.

DESCRIPTION OF THE PREFERRED EMBODIMENT

The preferred embodiments of the present invention will be described herebelow with reference to the accompanying drawings.

Figure 1:
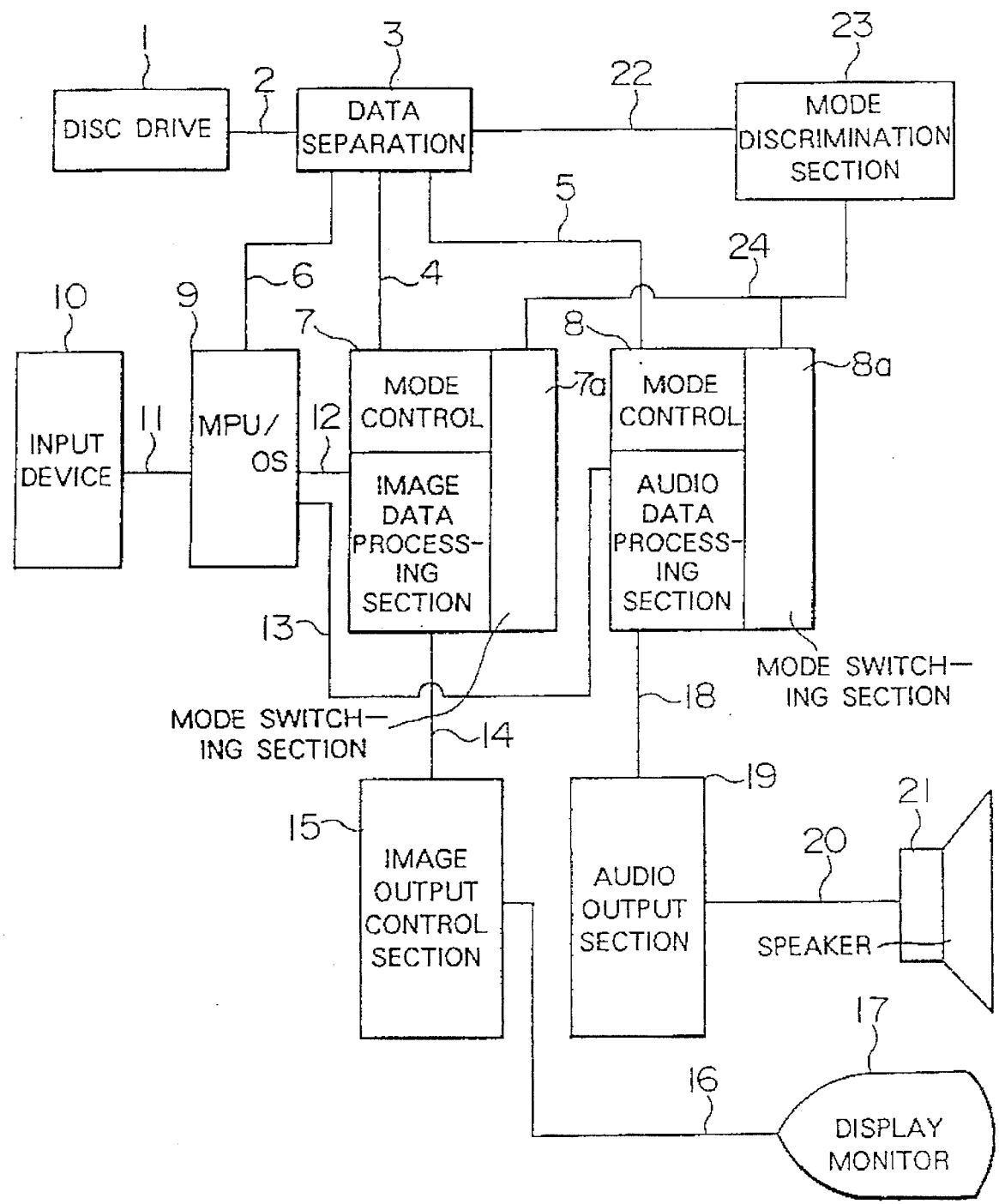
FIG. 1 is a block diagram showing the construction of the first embodiment of a multi-media reproduction processing apparatus according to the present invention.

FIG. 1 shows the construction of the first embodiment of a multi-media reproduction processing apparatus according to the present invention.

The multi-media reproduction processing apparatus of the invention includes a disc drive 1 functioning as a data supply device for reading data from a recording medium, a data separation device 3 for separating the data read out by the disc drive 1 depending upon the data structure, a mode discrimination section 23 for discriminating the operation mode based on a separated part of data specifying a reproduction mode, an image data processing section 7 for generating frame data of an image by processing the input data with a data structure determined by the specific operation mode, an audio data processing section 8 for decoding encoded input data into audio data, a processor section 9 for controlling operations of the image data processing section 7 and the audio data processing section 8, an input device 10 for externally entering operation commands and so forth for the processor section 9, an image output control section 15 for outputting the frame data from the image data processing section 7 in a form of a display signal, a display monitor 17 for displaying the display signal as a visual display, an audio output section 19 for converting the audio data from the audio data processing section 8 into an analog audio signal, and a speaker 21 for reproducing the audio signal as an acoustic output.

It is noted that, in FIG. 1, reference numeral 2 denotes input data, 22 denotes mode discrimination data, 4 denotes image data, and 5 denotes audio data. The reference numeral 6 denotes a processing program for managing and controlling the image data 4 and the audio data 5. Also, the reference numeral 11 denotes a control signal from the input device 10.

The reference numeral 12 denotes an image control signal which is output from the processor section 9. The reference numeral 14 denotes an image frame data which is output from the image data processing section 7 to the image output control section 15. The reference numeral 16 denotes a display signal output from the image output control section 15 to the display monitor 17. By this, the image data recorded on a CD-ROM is reproduced on the display monitor 17 as a still image or a motion picture.

The reference numeral 13 denotes an audio control signal output from the processor section 9. The reference numeral 18 denotes audio data output from the audio data processing section 8 to the audio output section 19. The reference numeral 20 denotes an analog audio signal output from the audio output section 19 to the speaker 21. Through the process set forth above, the audio data recorded on the CD-ROM can be reproduced through the speaker 21 as the acoustic output. The reference numeral 22 denotes mode discrimination data separated by the data separation device 3, which is input to a mode discrimination section 23. The reference numeral 24 denotes mode information output from the mode discriminating section 23 to the image data processing section 7 and the audio data processing section 8.

The disc drive 1 removably receives the recording medium and can read out the data from the recording medium mounted therein. Here, as the recording medium, the CD-ROM is used. The disc drive 1 performs reading out of the data recorded on the CD-ROM and supplies to the data separation device 3 as the input data 2. It should be appreciated that, on the CD-ROM, there is recorded multimedia data, such as image and audio information and so forth operable according to a specific reproduction mode.

The data separation device 3 separates the input data 2 into the image data 4, the audio data 5, the processing program 6 and the mode discrimination data 22. The image data 4 is supplied to the image data processing section 7. The audio data 5 is supplied to the audio data processing section 8. The processing program 6 is supplied to the processing section 9.

The processing section 9 respectively outputs the image and the audio control signals 12 and 13 to the image data processing section 7 and the audio data processing section 8.

The input device 10 includes an initiation switch such as a selection switch and so forth, and a key array, such as ten keys and so forth, and driver circuits thereof. The input device 10 further includes a pointing device having an input device for entry of an amount of displacement of a cursor corresponding to a display position of the cursor indicative of the position on the display monitor, selection switches therefor and a driver circuit thereof.

Next, operation of the embodiment of the multi-media reproduction processing apparatus will be described with reference to FIG. 1.

At first, the data on the CD-ROM to be used is read out by the disc drive 1. The read out data is supplied to the data separation device 3 as the input data 2. The data separation device 3 extracts the mode discrimination data 22 for determining which reproduction mode is used for the currently used CD-ROM, from the input data. The data recorded on the CD-ROM is used as the mode discrimination data. Detailed description will be given later.

Next, the mode discrimination data 22 is supplied to the mode discrimination section 23. The mode discrimination section 23 performs discrimination of the reproduction mode with reference to discrimination data previously stored therein. Based on the result of the discrimination, the mode discrimination section 23 generates mode information 24 indicative of the reproduction mode which is to be used. The mode information 24 is supplied to the image data processing section 7 and the audio data processing section 8 so that image data processing and audio data processing are performed in accordance with the reproduction mode indicated in the mode information 24. The image data processing section 7 and the audio data processing section 8 switches the reproduction mode in accordance with the mode information 24 by mode switching sections 7a and 8a.

Next, the image data 4 separated by the data separation device 3 is supplied to the image data processing section 7. The image data processing section 7 performs data expansion in accordance with the determined reproduction mode to generate frame data 14 of the image. The frame data 14 is output to the image output control section 15. The image output control section 15 converts the frame data 14 into a display signal 16 to be displayed on the display monitor 17. The display signal 16 is then supplied to the display monitor 17 for visual image reproduction.

On the other hand, the audio data 5 separated by the data separation device 3 is supplied to the audio data processing section 8. The audio data processing section 8 performs data expansion in accordance with the determined reproduction mode. As a result of expansion process, the audio data 18 as complete digital audio data is supplied to the audio output section 19. The audio output section 19 converts the input audio data 18 into the analog audio signal 20 to output to the speaker 21 for reproduction as the acoustic output.

Furthermore, the processing program 6 output from the data separation device 3 is for controlling and managing the image data 4 and audio data 5. That is, a control signal 11 supplied from the input device 10 is supplied to the processor section 9 which controls the image data processing section 7 and the audio data processing section 8 in accordance with the control signals 12 and 13 by using a previously supplied processing program 6, allowing processing in accordance with the processing program 6 recorded on the CD-ROM.

Next, description will be given for practical example of the mode discrimination data 22.

Exemplary description will be given for the case of discrimination for the CD-ROM having the volume file format in which files and directory structure are established in accordance with ISO9660 standard format (international standard format in International Organization for Standardization). On the CD-ROM recorded in accordance with ISO9660, there is a volume descripter on a sector. The content of this volume descripter can be used as the mode discrimination data. As described on pages 11 to 19 of ISO9660, 1988(E), there are four kinds of volume descripters. The following description is directed to discrimination of two types of CD-ROMs using primary volume descripters, which will be hereafter referred to as mode A and mode B. In 157th to 190th bits of the primary volume descripter contains information of content of the directory. Taking this content as the mode discrimination data 22, discrimination between the mode A and the mode B is performed based on the specific directory names used in the mode A and the mode B. In the alternative, it is possible that, by writing identification data for discrimination between the mode A and the mode B in application use of 884th to 1395th bits of the primary volume descriptor, the writing identification data is used as the mode discrimination data 22.

Figure 7:
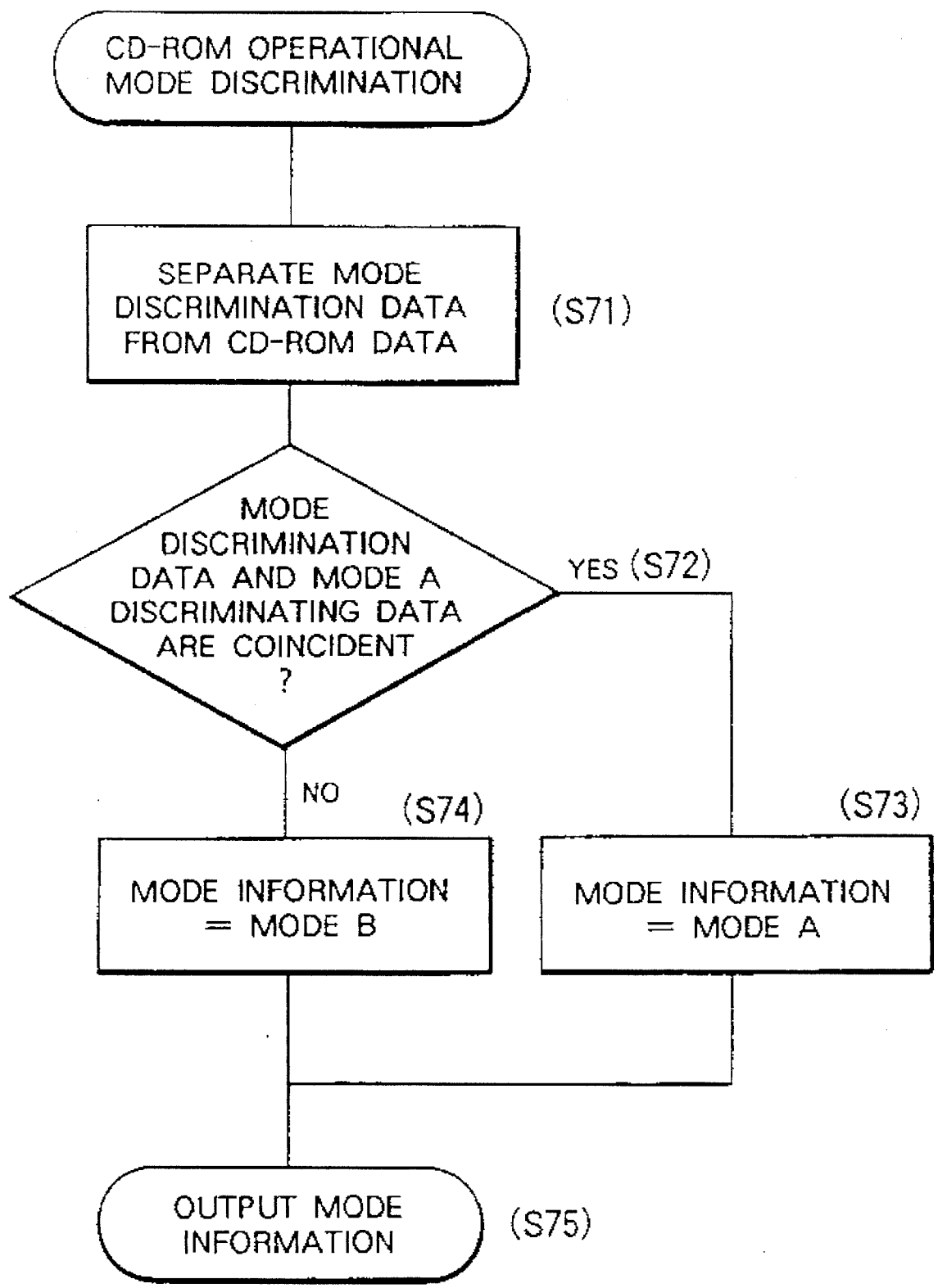
FIG. 7 is a flowchart showing operation of a mode discrimination.

Next, description will be given for operation of mode discrimination in accordance with the operational flowchart of the mode discrimination illustrated in FIG. 7.

At first, at a step S71, the mode discrimination data 22 is separated in the data separation device 3. Then, at a step S72, the mode discrimination data 22 is supplied to the mode discrimination section 23. In response to this, the mode discrimination section 23 compares the mode discrimination data 22 with previously set mode A discrimination data. When the mode discrimination data 22 is found coincident with the mode A discrimination data as compared at the step S72, the mode information 24 is set to indicate the mode A, at a step S73. Then, the mode information 24 is output at a step S75. On the other hand, when the mode discrimination data 22 is found not to be coincident with the mode A discrimination data as compared at the step S72, the mode information 24 is set to indicate the mode B at a step S73. Thereafter, the mode information 24 is output at the step S75. Although the process is directed to discrimination between two modes, i.e. the mode A and the mode B, it is, of course, equally possible to make discrimination between more than two modes. In such case, previously set discrimination data may be increased to the corresponding numbers and branches from the step S72 may be correspondingly increased. Also, it may be possible to preset discrimination data to be compared with mode discrimination data in a corresponding number as the modes to be discriminated.

Next, the construction and the operation of the image data processing section 7 suitable for the embodiment of the multi-media reproduction processing apparatus will be described with reference to FIG. 4.

Figure 4:
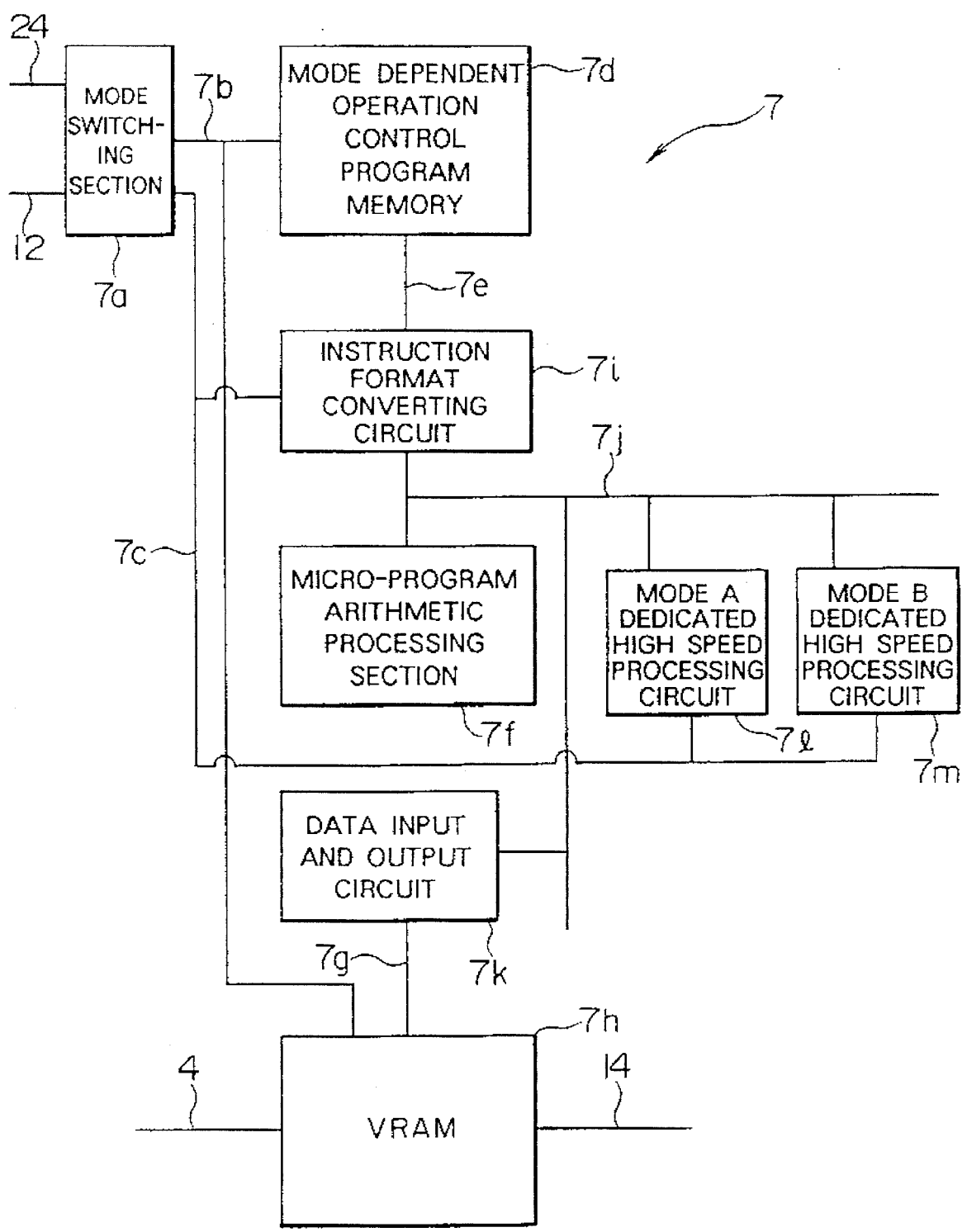
FIG. 4 is a block diagram showing construction of one embodiment of an image data processing section.

At first, the construction illustrated in FIG. 4 is described. The image data processing section 7 has a mode switching section 7a, a mode dependent operation control program memory 7d, a VRAM 7h, an instruction format conversion circuit 7i, a mode A is dedicated high speed processing circuit 7l, a mode B dedicated high speed processing circuit 7m, a micro-program arithmetic processing section 7f, a data input and output circuit 7k, a data bus 7e, a data bus 7g and a data bus 7j.

The mode dependent control program memory 7d and the instruction format conversion circuit 7i are connected through the data bus 7e. The instruction format conversion circuit 7i, the micro-program arithmetic processing section 7f, the mode A dedicated high speed processing section 7l, the mode B dedicated high speed processing section 7m and the data input and output circuit 7k, are connected through the data bus 7j. VRAM 7h is connected to the data input and output circuit 7k through the data bus 7g.

The mode information 24 and the image control signal 12 are supplied to the mode switching section 7a. The mode control signal 7b output from the mode switching section 7a is supplied to the mode dependent operation control program memory 7d and the VRAM 7h. The processing operation control signal 7c output from the mode switching section 7a is supplied to the instruction format conversion circuit 7i, the mode A dedicated high speed processing circuit 7l and the mode B dedicated high speed processing circuit 7m. The image data 4 is supplied to the VRAM 7h which outputs the frame data 14 in response thereto.

Figure 8:
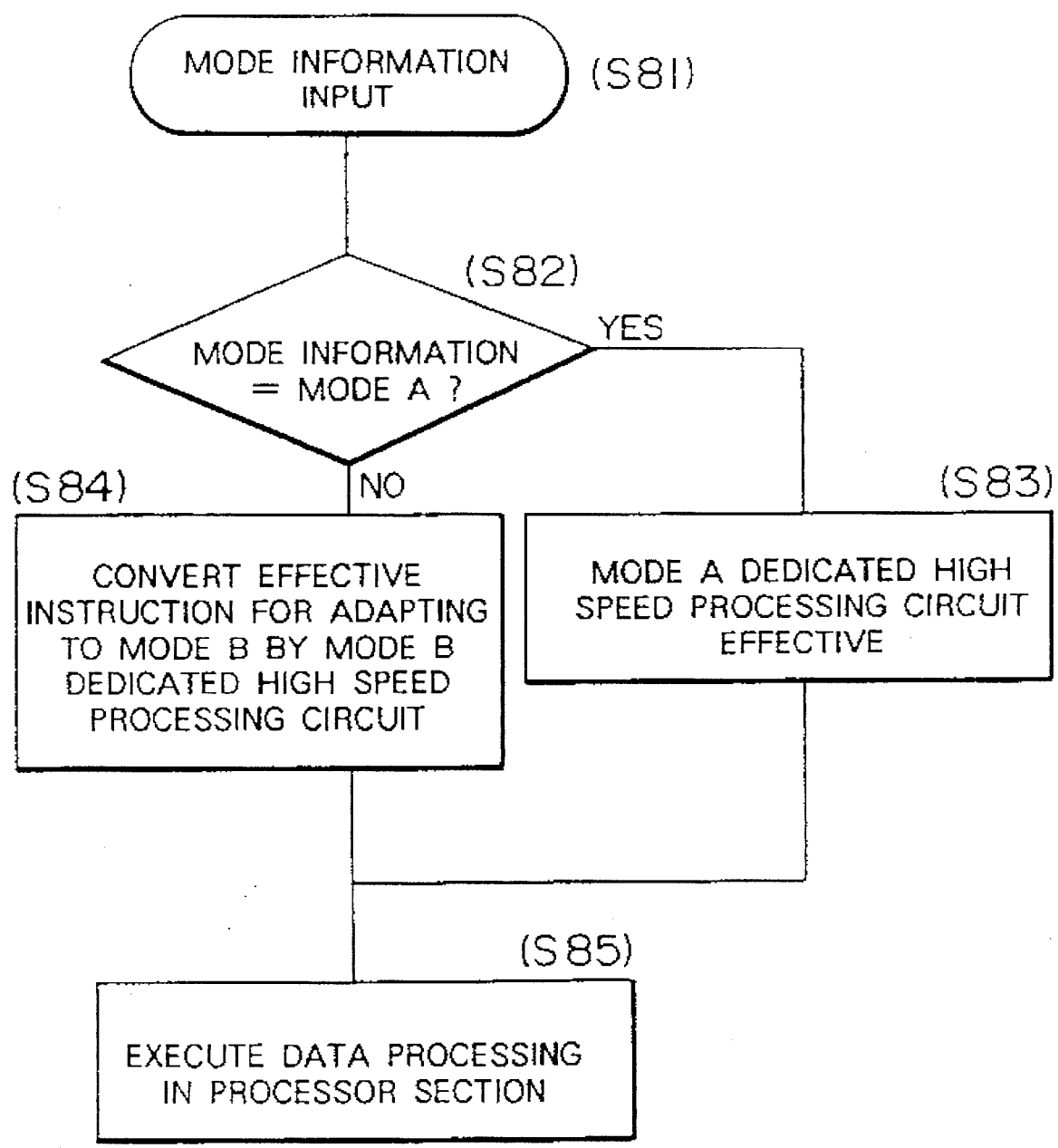
FIG. 8 is a flowchart showing operation of the image data processing section.

Next, operation of the image data processing section 7 as illustrated in FIG. 4 will be described with reference to the operational flowchart shown in FIG. 8.

The mode information 24 is supplied to the mode switching section 7a from the mode discrimination section 23 at a step S81. Then, the mode switching section 7a outputs the mode control signal 7b corresponding to the input mode information 24. On the other hand, the mode switching section 7a receives the image control signal 12 from the processor section 9 (FIG. 1) so that a processing operation control signal 7c is output on the basis of the micro-code recorded on the CD-ROM. The mode dependent operation control program memory 7d previously stores a micro_code interpreter for at least one or more reproduction modes. One of the reproduction modes is selected based on the mode control signal 7b, at a step S82. When the selected mode is the mode A, the micro-code is transferred to the instruction format conversion circuit 7i and the mode A dedicated high speed processing circuit 7l with the processing operation control signal 7c for controlling operation thereof, at a step S83. On the other hand, when the selected mode is the mode B, the micro-code is transferred to the instruction format conversion circuit 7i and the mode B dedicated high speed processing circuit 7m. In this case, the instruction format conversion circuit 7i converts the instruction structure of bit length and bit string of the micro-code adapted to the mode B so that the process can be performed with the common micro-program arithmetic processing section 7f, at a step 84. The converted micro-code is transferred to the mode dependent operation control program memory 7d via the data bus 7e. On the other hand, at a step S85, the converted micro-code is also transferred to the arithmetic micro-program arithmetic processing section 7f through the data bus 7j, at a step S85.

The mode A dedicated high speed processing circuit 7l and the mode B dedicated high speed processing circuit 7m are high speed processing circuits, such as decoder units dedicated for respective modes. For example, the high speed processing circuit has the dedicated circuit, such as a decoder for decoding data encoded with unique encoding method, a pixel interpolation circuit and so forth. When these are calculated in the micro-program arithmetic processing section 7f, it will take substantial period of time for processing. To avoid this, it becomes necessary to have a separate high speed circuit. On the other hand, in the foregoing embodiment, though there are provided two kinds of dedicated high speed processing circuits, it is, of course, possible to provide more than two dedicated high speed processing circuits.

The image data input to the VRAM 7h is transferred to the data input and output circuit 7k through the data bus 7g. For the data transferred to the data input and output circuit 7k, the image processing is performed at the micro-program arithmetic processing section 7f in accordance with the micro-code written in the mode dependent operation control program memory 7d, and the data is decoded in the mode A dedicated high speed processing circuit 7l or the mode B dedicated high speed processing circuit 7m. The decoded data is stored in the VRAM 7h as one frame image data and output as the frame data 14.

Figure 5:
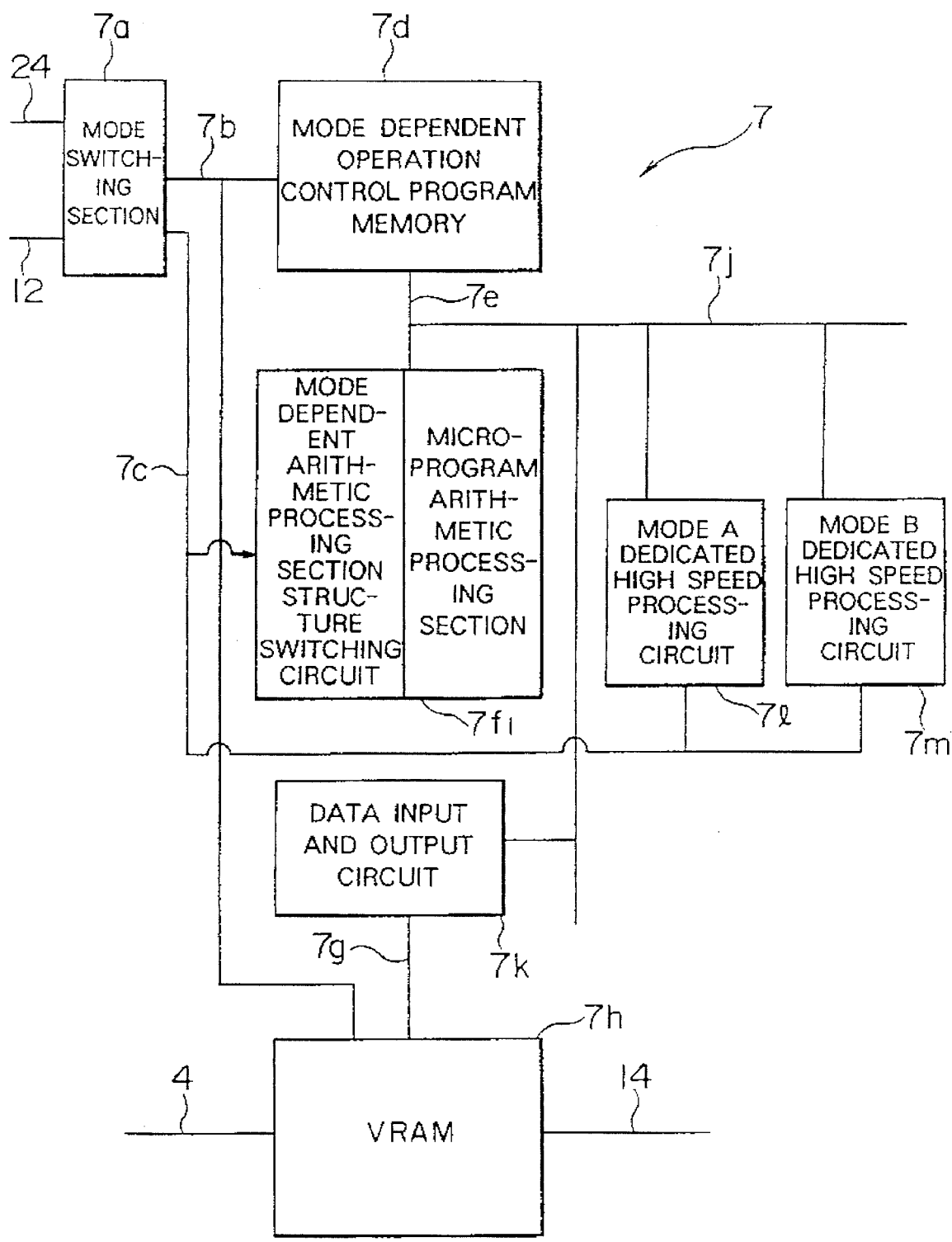
FIG. 5 is a block diagram showing construction of another embodiment of the image data processing section.

With reference to FIG. 5, another embodiment of the image data processing section will be described.

In the image data processing section 7 illustrated in FIG. 5, the difference from the image data processing section 7 of FIG. 4 resides on the instruction format conversion circuit 7i and the micro-program arithmetic processing section 7f. Namely, the embodiment is featured to have a mode dependent arithmetic circuit construction switching circuit in the micro-program arithmetic processing section 7fl, instead of the instruction format conversion circuit 7i employed in the embodiment of FIG. 4. In this case, without varying the structure of the instruction of the micro-code, the components, such as a register, an arithmetic process, counter, shifted and so forth of the arithmetically processing section 7fl is reconstructed depending upon the active mode of reproduction. This enables execution of the micro-codes in different modes.

Figure 9:
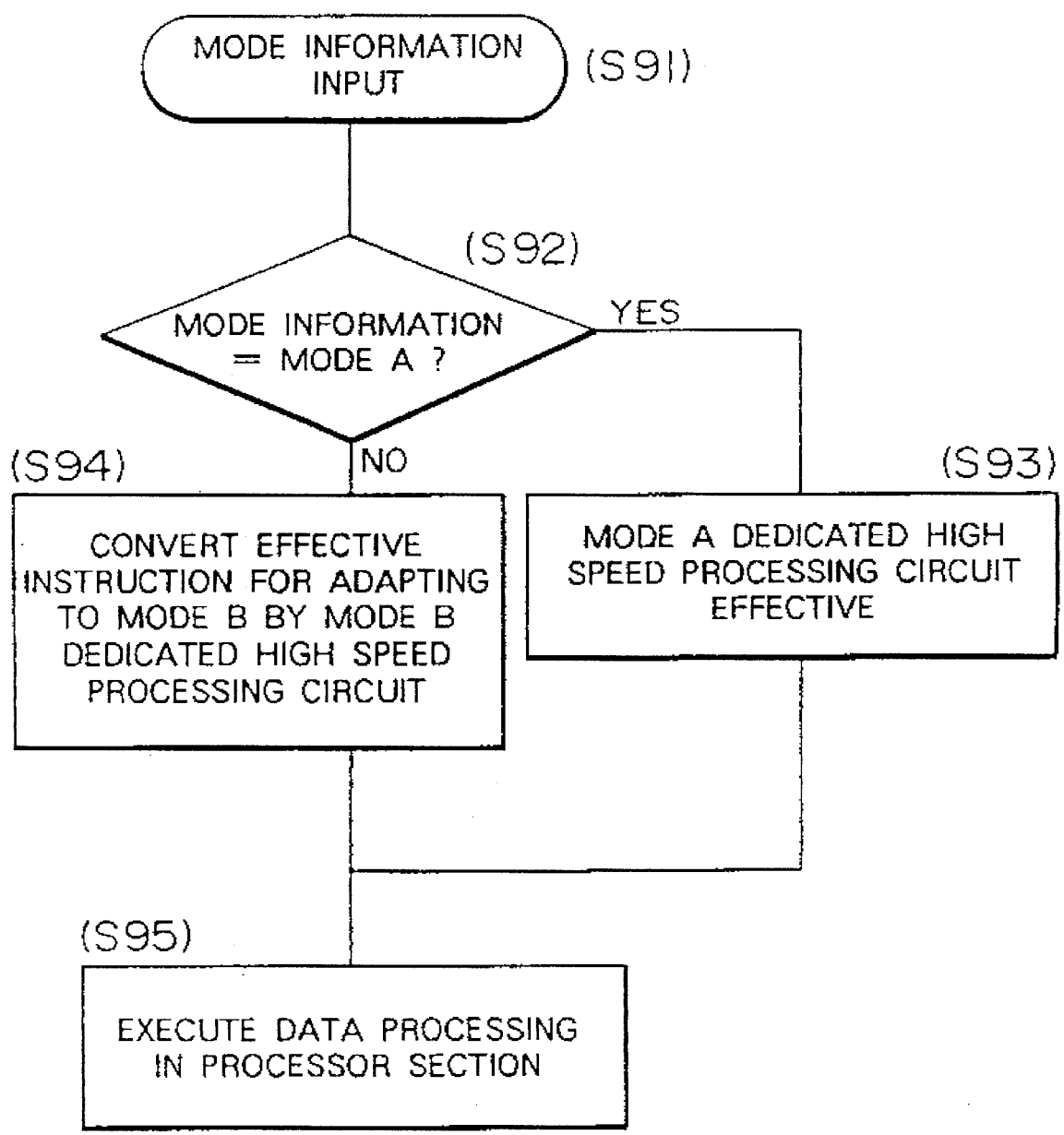
FIG. 9 is a flowchart showing operation of another embodiment of the image data processing section.

The operation of the image data processing section 7 illustrated in FIG. 5 will be described with reference to the flowchart shown in FIG. 9. At a step 91, the mode information 24 is supplied to the mode switching section 7a from the mode discrimination section 23. The mode switching section 7a outputs the mode information 24 as the mode control signal 7b. On the other hand, the image control signal 12 of the processor section 9 is also supplied to the mode switching section 7a. The mode switching section 7a outputs the process operation control signal 7c in accordance with the micro-code recorded on the CD-ROM. The micro-code interpreters for least one or more reproduction modes are previously stored in the mode dependent operation control program memory 7d. The reproduction mode is selected based on the mode control signal 7b, at a step S92. When the mode A is selected, the micro-code is transferred to the micro-program arithmetic processing section 7fl and the mode A dedicated high speed processing circuit 7l with the processing operation control signal 7c. On the other hand, when the selected mode is the mode B, the internal construction of the micro-program arithmetic processing section 7fl is switched into the construction adapted to the mode B, and then the micro-code is transferred to the micro-program arithmetic processing section 7fl and the mode B dedicated high speed processing circuit 7m for controlling. The micro-code is transferred to the microprogram arithmetic processing section 7fl via the data bus 7e, at a step S95.

Figure 6:
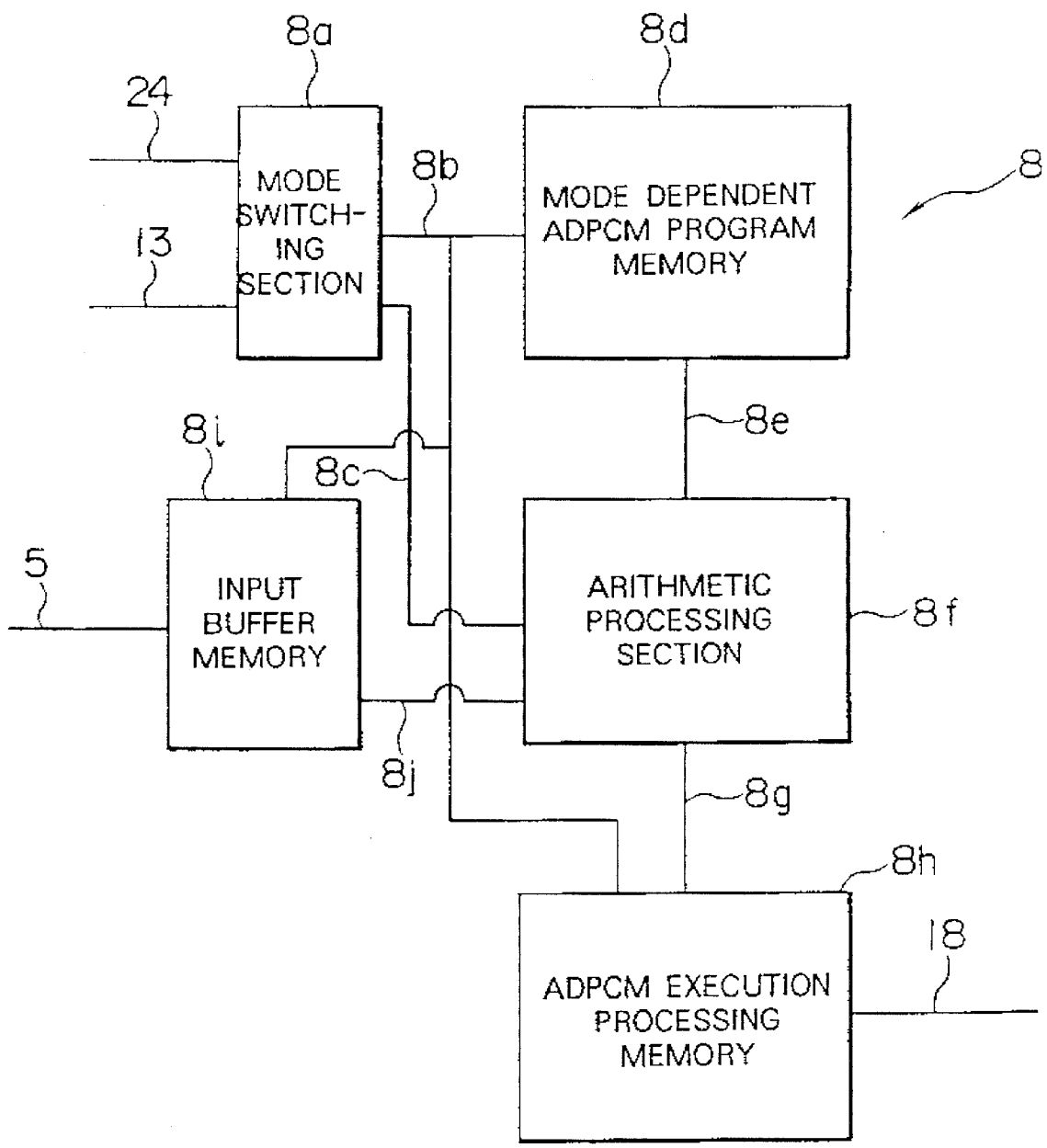
FIG. 6 is a block diagram showing the construction of an audio data processing section.

FIG. 6 shows an embodiment of the audio data processing section 8 suitable to be employed in the present invention.

In FIG. 6, the audio data processing section 8 has a mode switching section 8a, an ADPCM execution processing memory 8h, an input buffer memory 8i, a mode dependent ADPCM program memory 8d, and an arithmetic processing section 8f. Also, the audio data processing section 8 has data buses 8e and 8g. The mode dependent ADPCM program memory 8d and the arithmetic processing section 8f are connected through the data bus 8e. The arithmetic processing section 8f and the ADPCM execution processing memory 8h are connected through the data bus 8g.

The mode information 24 and the audio control signal 13 are supplied to the mode switching section 8a. A mode control signal 8b output from the mode switching section 8a is supplied to the mode dependent ADPCM program memory 8d, the ADPCM execution processing memory 8h and the input buffer memory 8i. A process operation control signal 8c output from the mode switching section 8a is supplied to the arithmetic processing section 8f. The audio data 5 is supplied to the input buffer memory 8i. The input buffer memory 8i outputs an input data 8j to the arithmetic processing section 8f. The ADPCM processing memory 8h outputs the audio data 18.

Next, operation of the audio data processing section 8 illustrated in FIG. 6 will be described. The mode switching section 8a selects a processing program for at least one or more reproduction modes stored in the mode dependent ADPCM program memory 8d in accordance with the active reproduction mode determined by the input mode information 24 and the audio control signal 13. Furthermore, the mode switching section 8a performs read/write control for the input buffer memory 8i and the ADPCM execution processing memory 8h by the mode control signal 8b for performing processing operation in accordance with the processing program recorded on the CD-ROM. The audio data 5 supplied to the input buffer memory 8i is supplied to the arithmetic processing section 8f as the input data 8j. The arithmetic processing section 8f performs expansion of the input data via the ADPCM execution processing memory 8h employing a data expansion algorithm selected at the mode dependent ADPCM program memory 8d. Thus, the expanded audio data 18 is output from the ADPCM execution processing memory 8h.

In the above-mentioned embodiment, even when a plurality of reproduction modes are present, the process operation adapted to respective modes can be performed by previously storing the programs to be used in respective modes in the mode dependent ADPCM program memory 8d, with common hardware construction, by simply selecting the modes.

In the foregoing embodiment, the mode switching sections 7a and 8a are internally incorporated to the image data processing section 7 and the audio data processing section 8. However, it is also possible to provide these mode switching sections 7a and 8a as external elements separately from the mode switching sections 7a and 8a.

Figure 3:
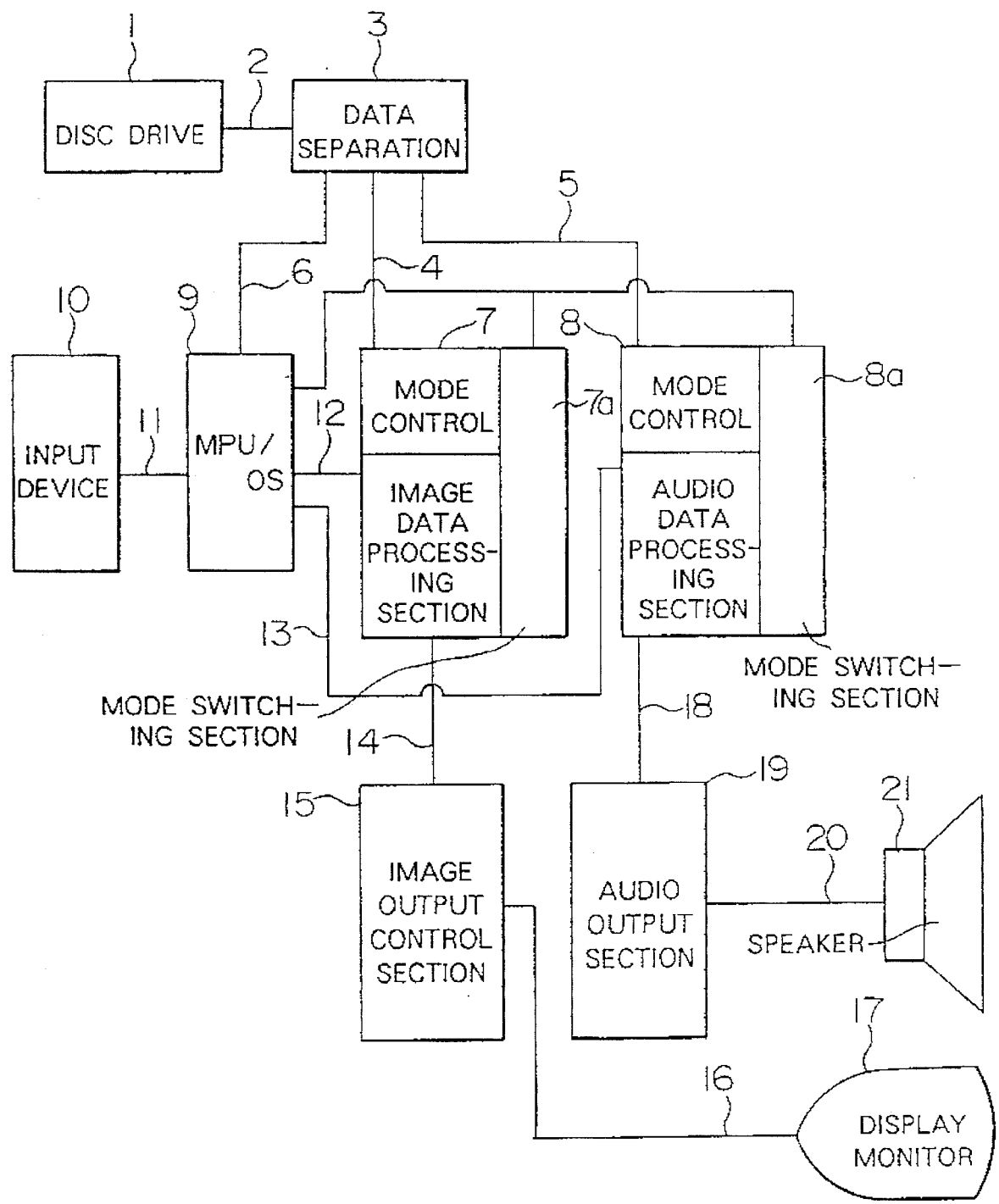
FIG. 3 is a block diagram showing the construction of the second embodiment of the multi-media reproduction processing apparatus in accordance with the invention.

Next, the second embodiment of the multi-media reproduction processing apparatus in accordance with the present invention will described herebelow with reference to FIG. 3.

The second embodiment illustrated in FIG. 3 does not have the mode discrimination section 23 employed in the first embodiment of FIG. 1. In this case, the mode information 24 Supplied to the image data processing section 7 and the audio data processing section 8, is output from the processor section 9. Other construction is the same as that in the embodiment of FIG. 1.

In this embodiment, the data on the CD-ROM, read out by the disc drive 1 is separated into the image data 4, the audio data 5 and the processing program 6 by the data separation device 3. In this case, the processing program 6 includes data for discriminating the mode. In the processor section 9, the data for discriminating the reproduction mode of the CD-ROM is read out. The processor section 9 performs discrimination of the reproduction mode and outputs the mode information 24 to the image data processing section 7 and the audio data processing section 8. Thus, the data expansion process and outputting process of the image and audio data are performed in accordance with the reproduction mode determined by the mode information 24, substantially in the same manner as in the embodiment of FIG. 1.

With this embodiment, since the discrimination of the reproduction mode can be done without employing the dedicated hardware, the present invention can be implemented with lesser hardware construction.

Next, the third embodiment of the multi-media reproduction processing apparatus of the present invention will be described herebelow with reference to FIG. 10.

Figure 2:
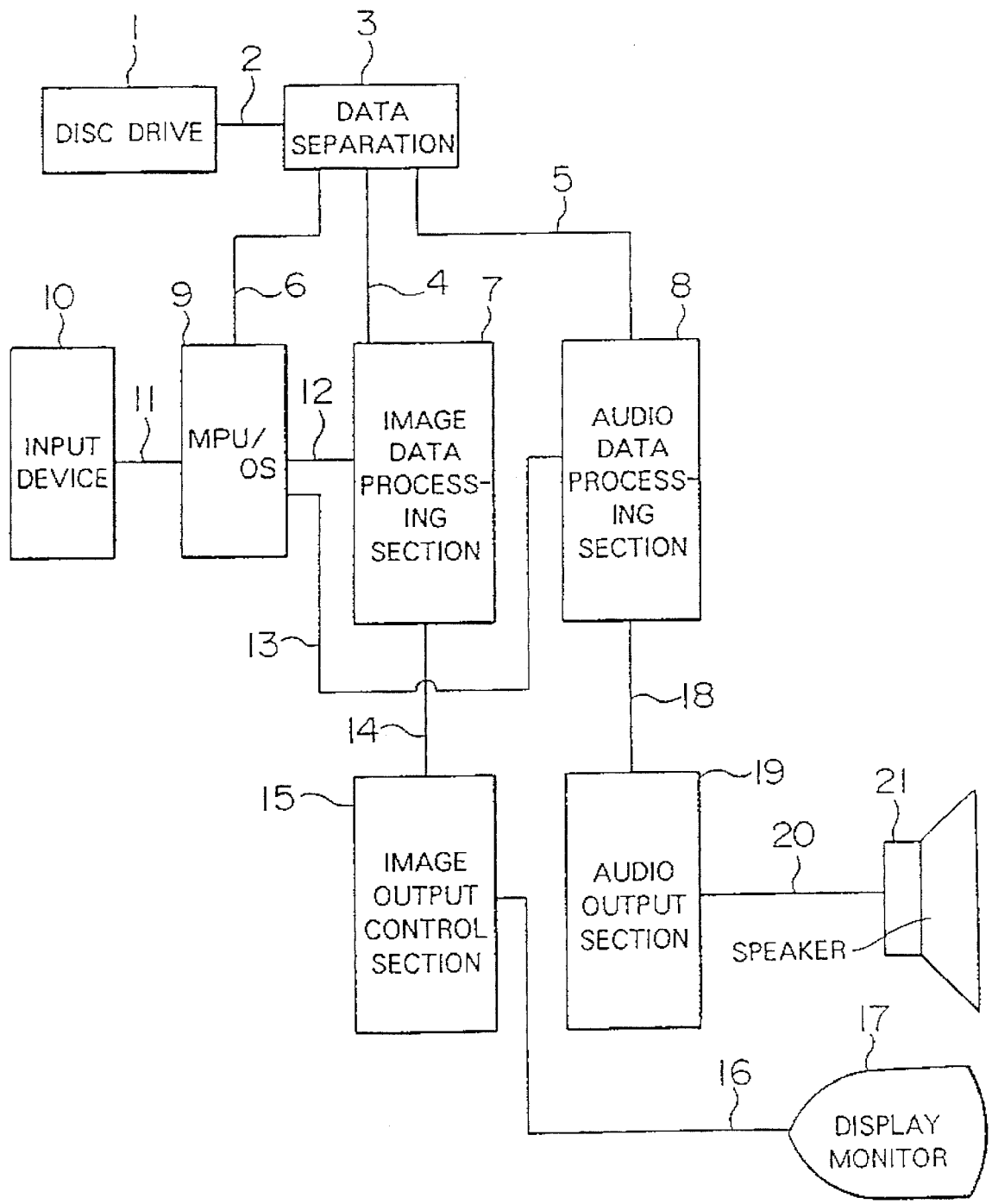
FIG. 2 is a block diagram showing the construction of the conventional multi-media reproduction processing apparatus.
Figure 10:
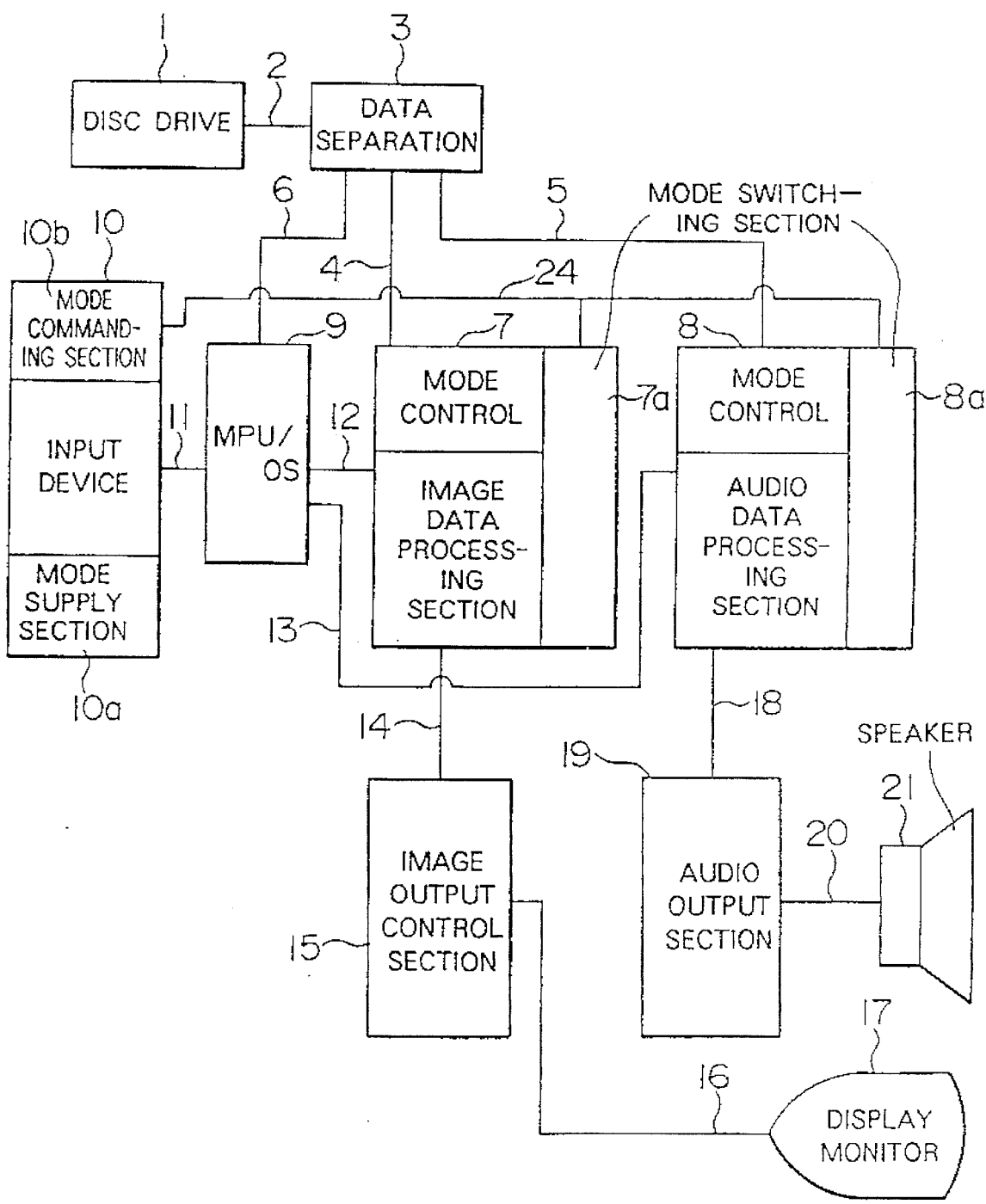
FIG. 10 is a block diagram showing the construction of the third embodiment of the multi-media reproduction processing apparatus of the invention.

In the embodiment of FIG. 10, reference numerals represents components corresponding to the embodiment of FIG. 2. The input device 10 has a mode supply section 10a and mode commanding section 10b. The mode information 24 supplied to the image data processing section 7 and the audio data processing section 8 is output from the mode commanding section 10b of the input device 10. Other construction is the same as that in FIG. 3.

In the embodiment, the user previously interacts through the mode supply section 10a of the input device 10 to perform the operation for switching the type of the CD-ROM or so forth to be used in order to define the reproduction mode or data format of the CD-ROM to be used. The input device 10 is responsive to the command entered by the user to output the mode information 24 as a signal representative of the reproduction mode of the CD-ROM. As set forth above, the mode information 24 is then supplied to the image data processing section 7 and the audio data processing section 8. Thus, the data expansion and output processes are performed in accordance with the reproduction mode defined by the mode information 24 in the similar manner to that of the embodiment of FIG. 1.

The embodiment allows the user to make selection of the reproduction mode through manual operation of the user. With the shown construction, the hardware for discriminating the mode becomes unnecessary.

As set forth, according to the foregoing first embodiment of the invention, when CD-ROM recording the image, audio and the processing program, the reproduction mode can be automatically detected to enable expansion of the compressed data even when data formats or reproduction modes are differentiated in the CD-ROMs to be used, it becomes possible to reproduce CD-ROMs having a plurality of mutually distinct reproduction modes with a common apparatus without providing reproduction processing apparatus for respective types of CD-ROMs to be used.

According to the second embodiment, since the discrimination of the reproduction mode can be done in the processor section 9 which performs control in accordance with the processing program in the CD-ROM, reproduction of different reproduction modes of CD-ROMs can be done with a minimum of additional dedicated hardware for discrimination of the reproduction mode.

According to the third embodiment, a user is allowed to manually set different reproduction modes of the CD-ROMs by manual operation through the input device 10.

On the other hand, it is also possible to provide the mode supply section 10a of the mode input device 10 of the third embodiment and a selection device (not shown) for selecting one of the mode discrimination section 23 and the mode input device 10 for inputting the mode information 24, to the construction of the first embodiment. In such case, the user is allowed to select automatic discrimination of the mode information 24 or manual entry of the reproduction mode.

It is noted that it is further possible to provide a data supply device for reading data from the recording medium, the data separation device 3 for separating the mode discrimination data 22 for identifying the reproduction mode, the mode discrimination section 23 for discriminating the reproduction mode of the recording medium, and the mode switching section 8a in accordance with the mode information, in the disc drive unit. In such construction of the embodiment, the disc drive unit can be used in common with a plurality of the reproduction processing apparatuses.

On the other hand, it is further possible to provide a switching device (not shown) which has the data separation device 3 for separating the mode discrimination data 22 for identifying the mode of the input data 2 from the disc drive unit, the mode discrimination section 23 for discriminating the reproduction mode of the recording medium, and the mode switching section 8a for switching reproduction mode in accordance with the mode information 24. In this embodiment, it becomes possible to automatically select one of a plurality of reproduction processing apparatuses by providing such switching device for the system including the disc drive and a plurality of reproduction processing apparatuses.

As set forth above, when the CD-ROM recording the image, audio and other processing programs to be reproduced, since processing operation for expansion of the compressed digital data in accordance with the reproduction mode can be performed even when the format or reproduction mode of the data on the CD-ROM to be used is differentiated, the CD-ROMs having a plurality of mutually distinct reproduction modes can be reproduced with the common reproduction processing apparatus without providing a plurality of reproduction processing apparatuses for respective types of CD-ROMs to be used.

Next, the fourth embodiment of the multi-media reproduction processing apparatus in accordance with the present invention will be described in reference to FIG. 11. The reproduction processing apparatus is formed by providing a disc memory 30 for the processor section 9 of FIG. 1, for example. As already described with respect to FIG. 1, the reproduction device 31 includes an image data reproducing system having the image output control section 15, the display monitor 17, an image data processing section 7, a mode switching section 7a, and an audio data reproduction system having an audio output section 19, an audio data processing section 8, a mode switching section 8a, and a speaker 21. A signal processing section 32 performs expansion and decoding of a compressed and coded image, and audio stream data by a processing program identifying an algorithm for each of the expansion and the decoding. A disc drive 1 supplies compressed and decoded motion picture stream data, audio stream data, still image data, an application program for controlling successive output operation of an audio signal synchronized with the motion picture and other audio signals, and a processing program (or microcode) identifying an algorithm which is used for expanding and decoding data previously compressed and coded. The disc drive 1 can also supply data to the signal processing section 32 by a driver unit of the CD-ROM. The disc memory 30 stores the processing program. A processing result from the signal processing section 32 is supplied to the reproduction device 31 to output to the display to the reproduction device 31 to output to the display monitor 17 and the speaker 21. Other constructional elements like the former embodiments will be represented by the same reference numerals.

Figure 25:
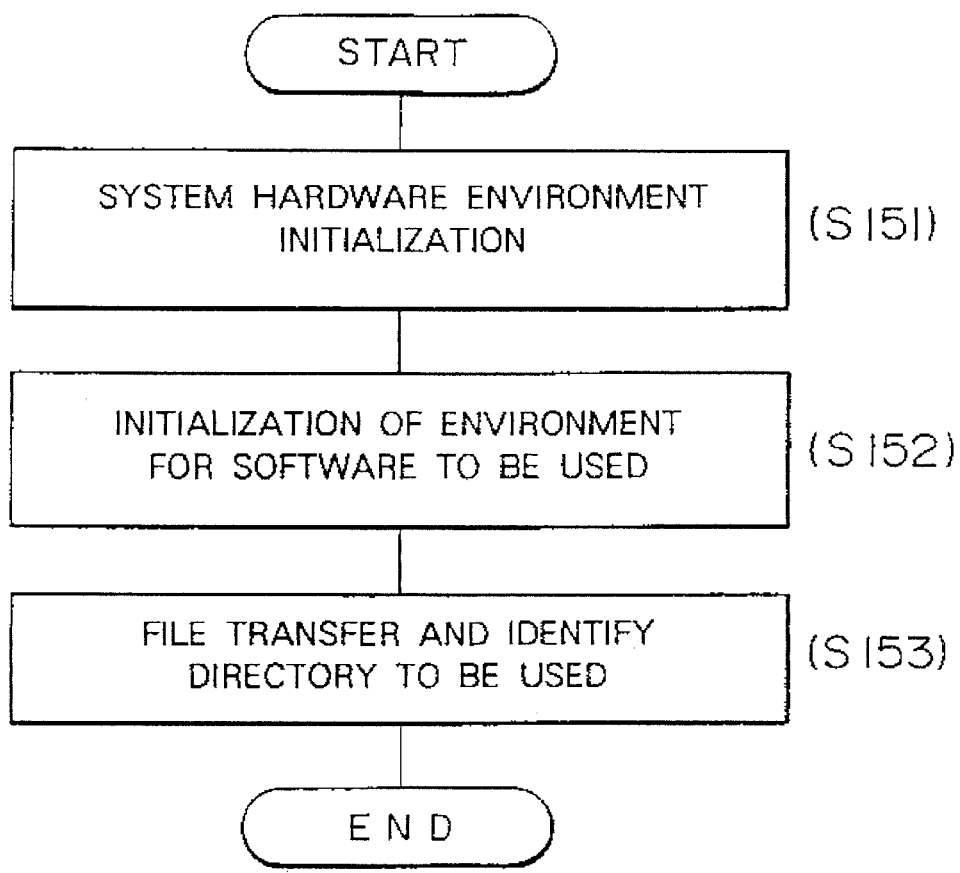
FIG. 25 is a flowchart showing an initialization program to be executed in the multi-media reproduction processing apparatus.
Figure 26:
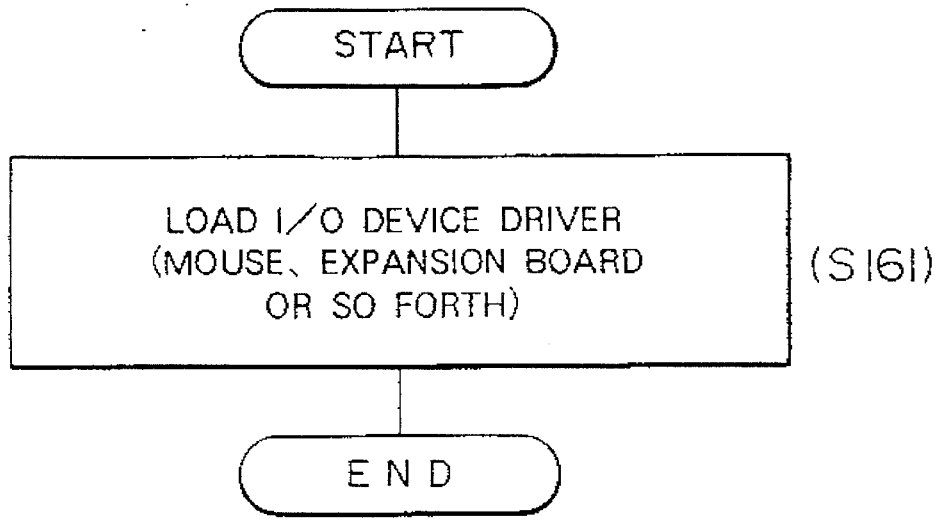
FIG. 26 is a flowchart showing a process of initialization of a hardware environment of the multi-media reproduction processing apparatus.
Figure 27:
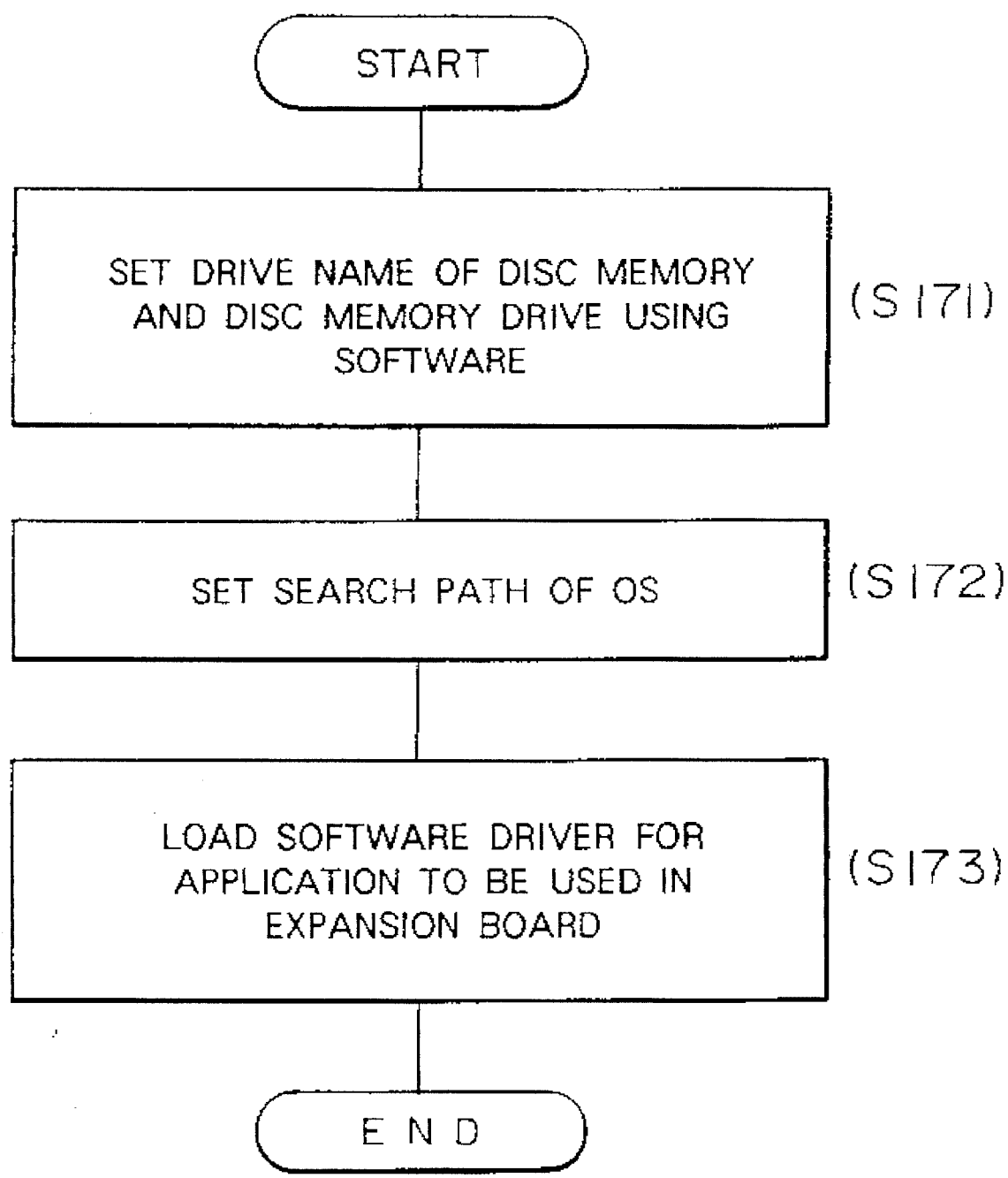
FIG. 27 is a flowchart showing a process of initialization of a software environment of the multi-media reproduction processing apparatus.
Figure 28:
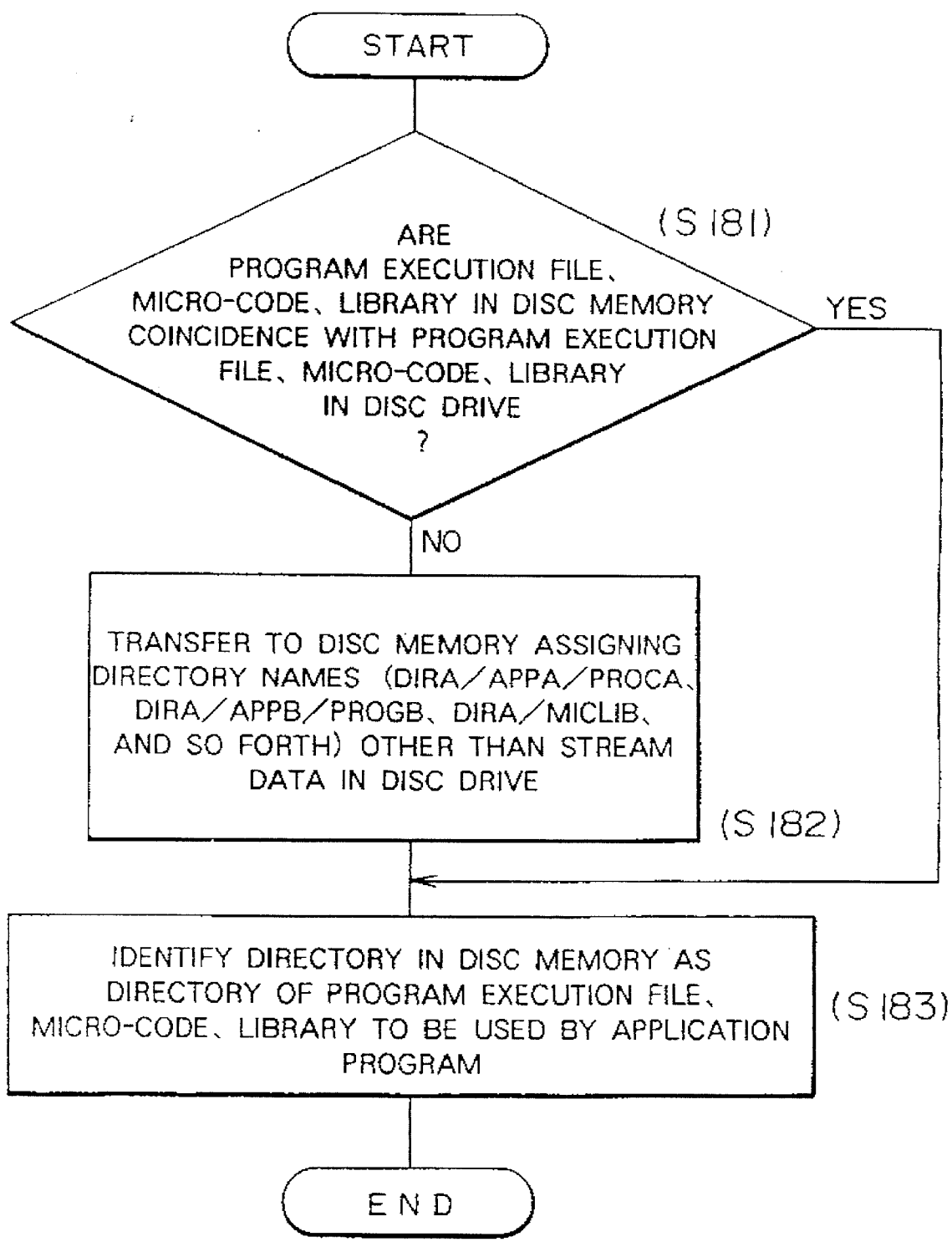
FIG. 28 is a flowchart showing processes of a file transfer and an identification of a directory to be used.

The operation of the multi-media reproduction processing apparatus illustrated in FIG. 11 will be discussed with reference to the flowcharts of FIGS. 25, 26, 27 and 28. FIG. 25 shows a flowchart of a system initialization program, FIG. 26 shows a flowchart of a system hardware environment initialization process, FIG. 27 shows a flowchart of a system software environment initialization process, and FIG. 28 is a flowchart showing a process of the file transfer and identification of a directory to be used.

Figure 11:
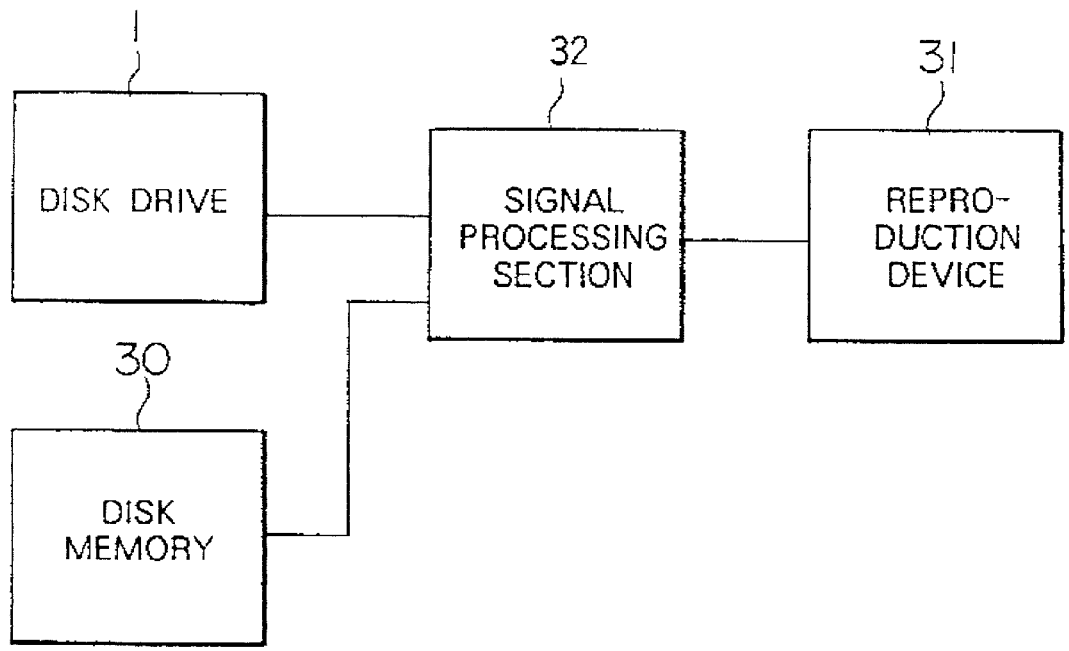
FIG. 11 is a block diagram showing the construction of the fourth embodiment of the multi-media reproduction processing apparatus of the invention.

When the operation of the reproduction processing apparatus illustrated in FIG. 11 is initiated, or, in the alternative, the reproduction processing apparatus is reset, the system initialization program is initialized in the signal processing section 32. Namely, as shown in the flowchart of the system initialization program of FIG. 25, at a step 151, system hardware environment initialization is performed. In the process of the system hardware environment initialization process, at a step 161 as shown in FIG. 26, loading of an I/O device driver is performed for setting a mouse or an expansion board and so forth.

Next, at a step 152, the initialization of the environment of the software to be used is performed. In the process of the system software environment initialization, setting of drive names of the disc drive 1 and the disc memory 30 is performed at a step S171. Then, at a step S172, setting of an OS (operating system) interface is performed. Thereafter, at a step S173, loading of a software driver for application be used on the expansion board is performed.

Then, at a step S153, the file transfer and identification of the directory to be used are performed. As shown in FIG. 28, at a step S181, the process decides whether the processing program of the disc drive 1 is present on the disc memory 30 or not. Namely, the decision is performed whether or not the files, such as program execution file, micro-code, library in the directory, such as DIRA/APPA/PROGA, DIRA/APPB/PROGB, DIRA/MIBLIB and so forth, are coincident with the files in the disc memory 30. When the coincident files are not present in the disc memory 30, at a step S182, the files are transferred to the disc memory 30 by identifying the directory name. When the files are present in the disc memory 30 or after file transfer to the identified directory, at a step S183, the processing program to be used in the signal processing section 32 is assigned as a directory. Through the process set forth above, the reproduction processing apparatus is started.

Next, in the signal processing section 32, the stream data is processed and reproduced using the processing program in the disc memory 30 for reproducing the image and the audio signal through the reproduction processing apparatus having the display and the speaker. When the disc drive 1 is newly started while the reproduction processing apparatus is already started, the process is started from the flowchart for transferring the file and identifying the directory to be used, as illustrated in FIG. 28. The detail of the reproduction process of the signal processing section 32 will be described in detail herebelow.

Figure 29:
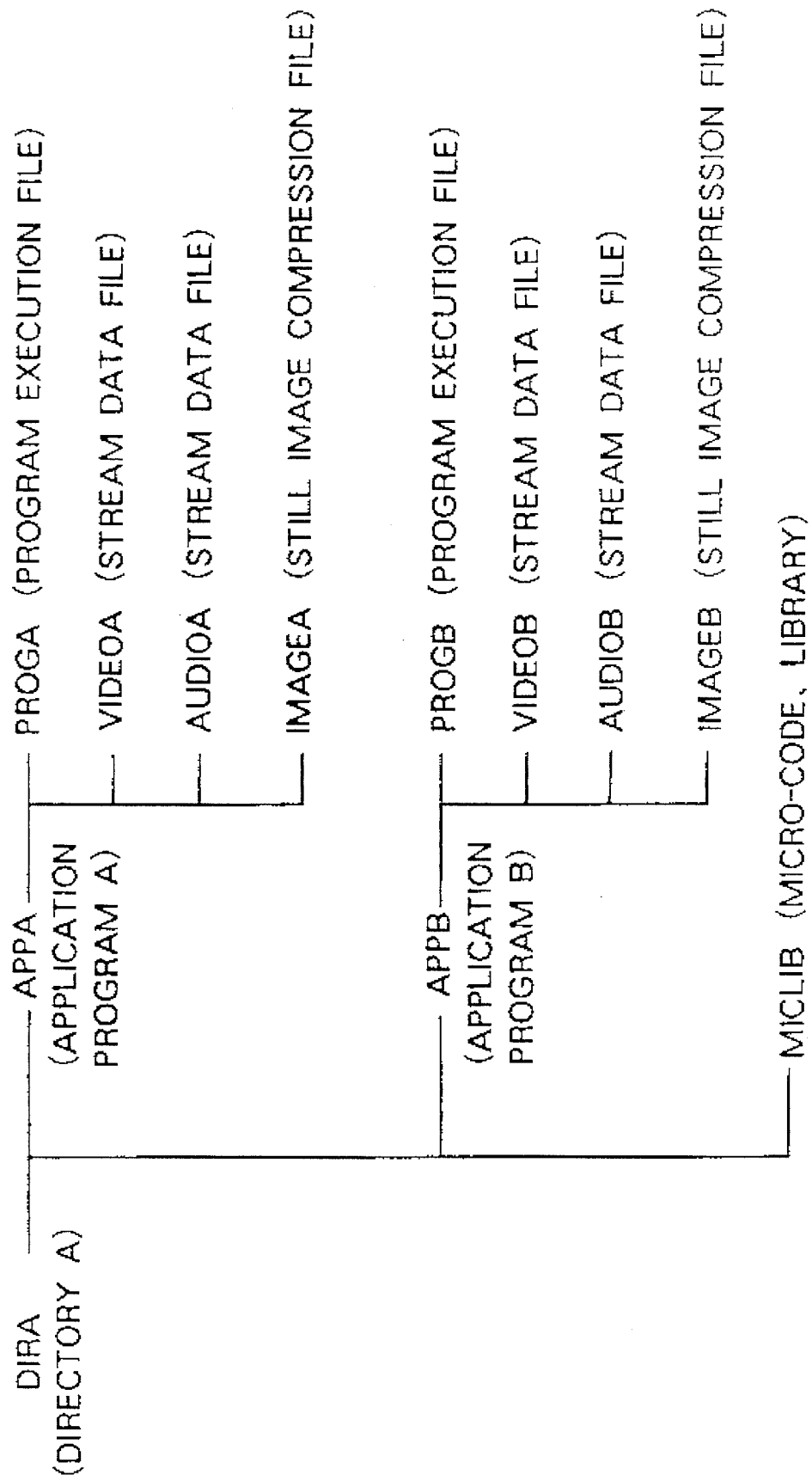
FIG. 29 is an explanatory illustration showing structure of a directory in a CD-ROM.

Practical judgement method in a step S181 shown in FIG. 28 will be described with reference to FIG. 29. FIG. 29 shows an example of directory structure in the CD-ROM. File names are classified depending on the types of the files, as shown. For example, an application program is assigned the name "APP", the processing program is assigned the name "MICLIB" and so forth. Utilizing this fact, by comparing the file names from the disc drive 1 with the file names in the disc memory 30, the discrimination can be made. In addition, by comparing the contents of the programs, it can be applicable to the same file names but different contents.

Figure 30:
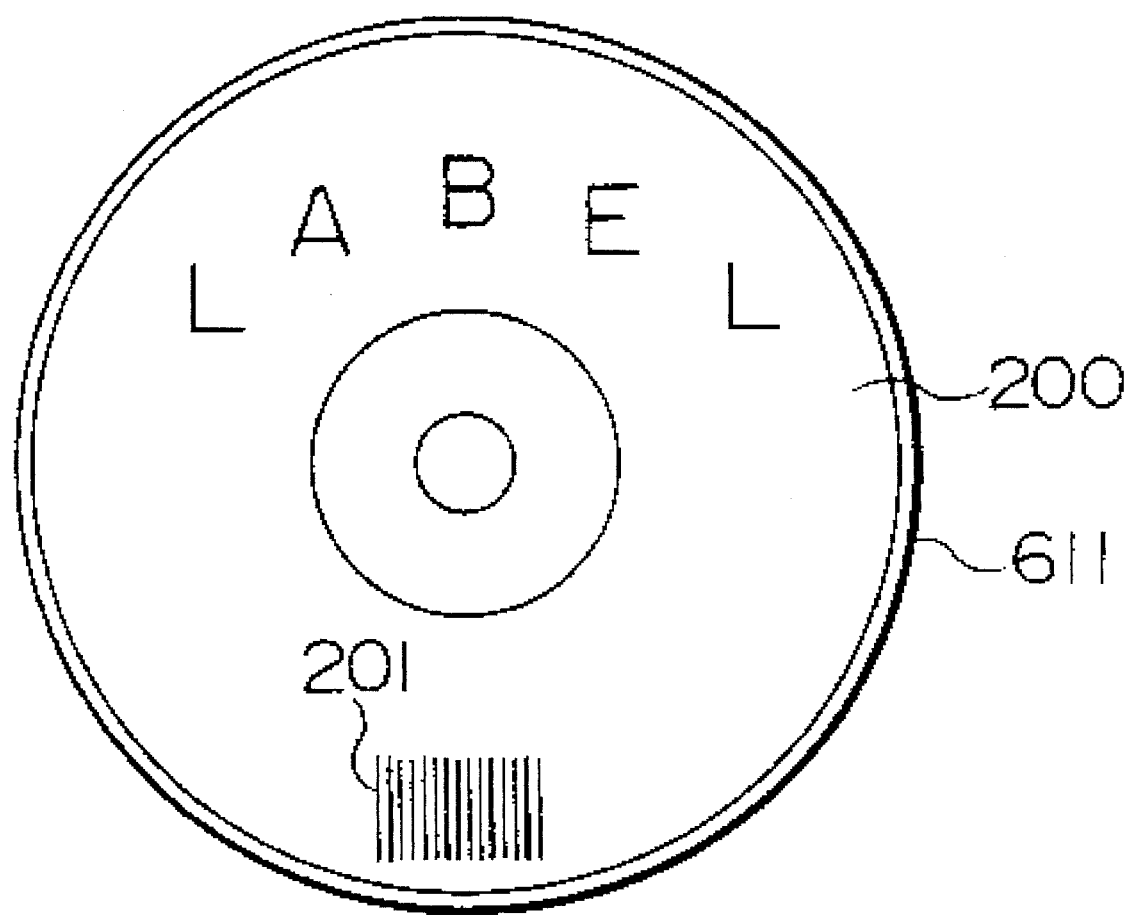
FIG. 30 is a plan view of an example of the CD-ROM with an identification code.
Figure 31:
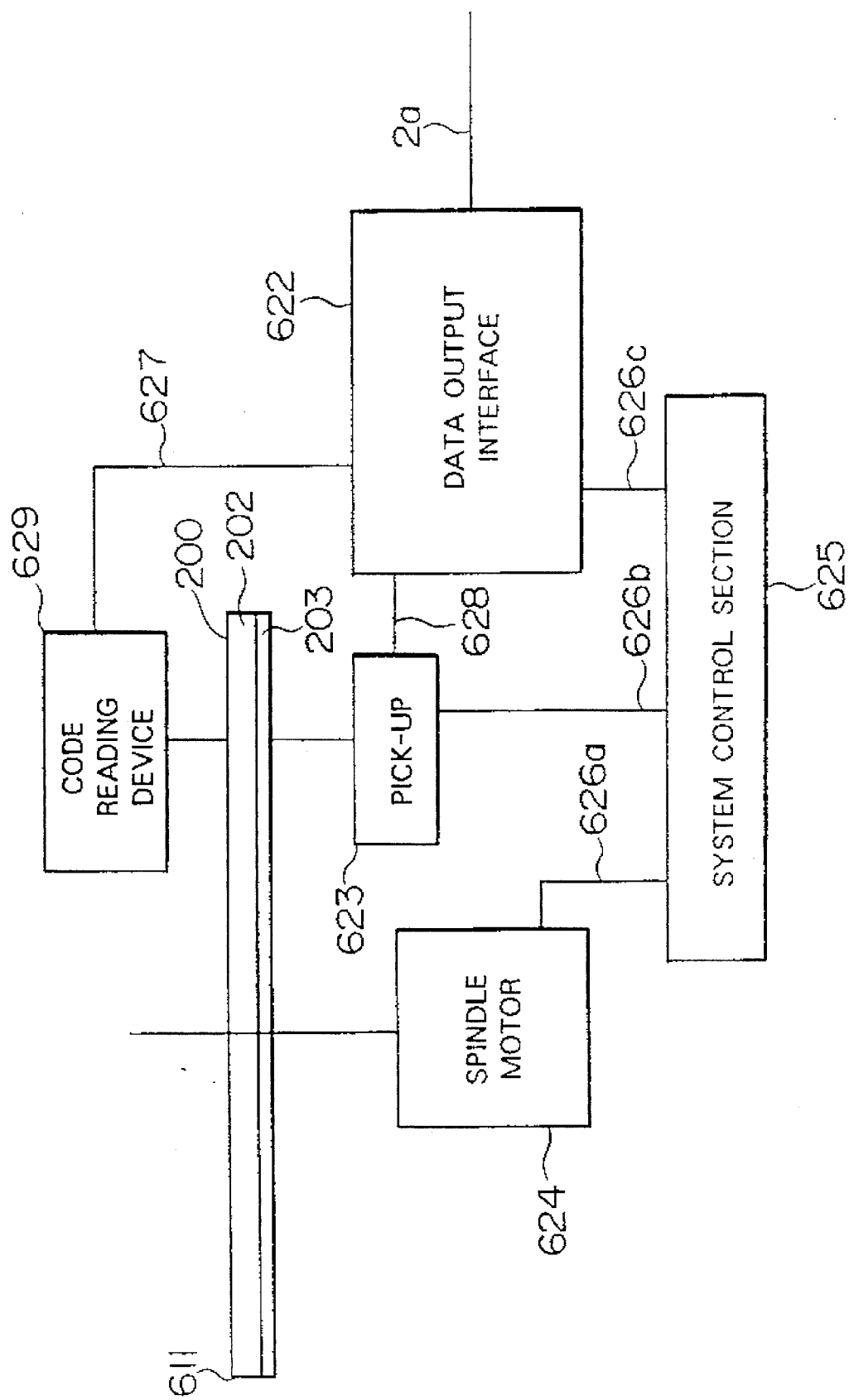
FIG. 31 is a block diagram showing construction of a CD-ROM driver incorporating an identification code reading device.
Figure 32:
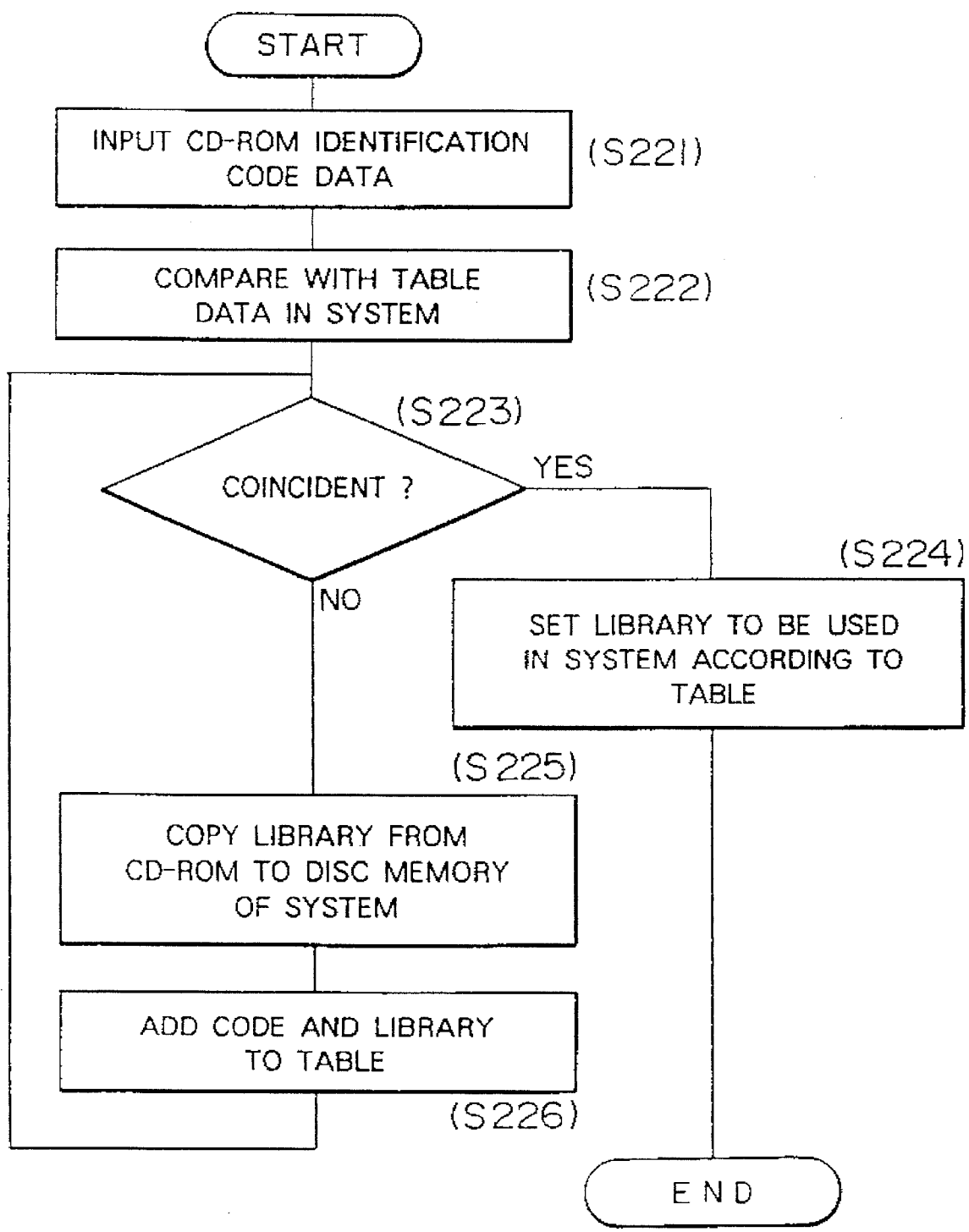
FIG. 32 is a flowchart showing a process of switching of an identification micro-code of the CD-ROM.

Other embodiments of discrimination methods in the step S181 shown in FIG. 28 will be described with reference to FIGS. 30, 31 and 32 and the following table 1. FIG. 30 shows an example, in which the CD-ROM with an identification code is used. FIG. 31 shows an example of the CD-ROM driver with an identification code reading device. FIG. 32 shows a flowchart for identification of CD-ROM and switching micro-code to be used.

TABLE 1

Table Stored in Reproduction Processing Device

| Identification Code No. | Library to be Used |
|---|---|
| 1, 2, 3 | Version A |
| 4 | Version B |
| 5 | Version C |

In the embodiment, as shown in FIG. 30, on a label surface 200 of the CD-ROM 611, the identification code 201 is provided. The identification corresponds to library (processing program) to be used, as shown in the foregoing Table 1. The Table 1 is previously established in the disc memory 30 of the reproduction processing apparatus. Then, by utilizing the CD-ROM driver with the identification code reading device, the identification code can be read out. In FIG. 31, the reference numeral 611 denotes the CD-ROM, 202 denotes a substrate of the CD-ROM, 203 denotes a data recording surface, 622 denotes a data output interface, 623 denotes a pick-up, 624 denotes a spindle motor, 625 denotes a system controller, 629 denotes a code reader. The reference numerals 626a, 626b and 626c denote control signals, 627 denotes code data, 628 denotes a CD-ROM data, 2a denotes a CD-ROM data/code data.

With the CD-ROM driver shown in FIG. 31, the identification code 201 on the label surface 200 of the CD-ROM 611 can be read out by the code reader 629 as well as normal CD-ROM data. The code data 627 read out is supplied to the signal processing section 32 though the data output interface 622 as the CD-ROM data/code data 2a.

The signal processing section 32 processes the input CD-ROM data/code data 2a through the process illustrated in a form of a flowchart in FIG. 32. At a step S221, the CD-ROM identification code data is supplied. Then, the input CD-ROM identification code data is compared with the table data in the reproduction processing apparatus, at a step S222, and then, a decision is performed whether one of the data in the table is coincident with the input CD-ROM identification code data, at a step S223. When the data coincident with the input CD-ROM identification code data is present, the library to be used is assigned in the reproduction processing apparatus in accordance with the table, at a step S224. On the other hand, when no data in the table is coincident with input CD-ROM identification code data, the library is transferred from the CD-ROM to the disc memory 30 of the reproduction processing apparatus, at a step S225. Thereafter, at a step S226, the transferred library is added to the table. As set forth above, by using the identification code at the step S181, discrimination can be made.

According to the embodiment, when the processing program 6 is not present in the disc memory 30, the processing program 6 is automatically transferred to the disc memory 30. On the other hand, when the processing program 6 is present in the disc memory 30, it can be read out from the disc memory 30 at high speed. For example, when the disc driver 1 is constructed with a driver device, to which the recording mediums such as the CD-ROMs can be replaceably loaded, once the CD-ROM is loaded and the reproduction processing apparatus takes up the operation, the processing program can be read out at high speed from the disc memory 30 from the next occasion. This is an advantage in that a period required for actually initiating the reproduction of the motion picture or the still image and the audio from initiation of execution of the application program can be shortened. Since the processing program 6 is much smaller in volume than the stream data, the capacity of the disc memory 30 can be much smaller than that of the recording medium to be loaded in the driver device of the disc drive 1.

It is appreciated that it is possible to read out solely the processing program 6 for data expansion decoding the program and inputting the application program through the disc drive 1. In such case, when the algorithm for data expansion is used for different types of application programs, it becomes necessary to store only the minimum common processing program for data expansion and decoding, thus the capacity required for the disc memory 30 can be further reduced. Next, further detail of the signal processing section 32 and the reproduction device 31 will be described with reference to FIG. 24.

Figure 24:
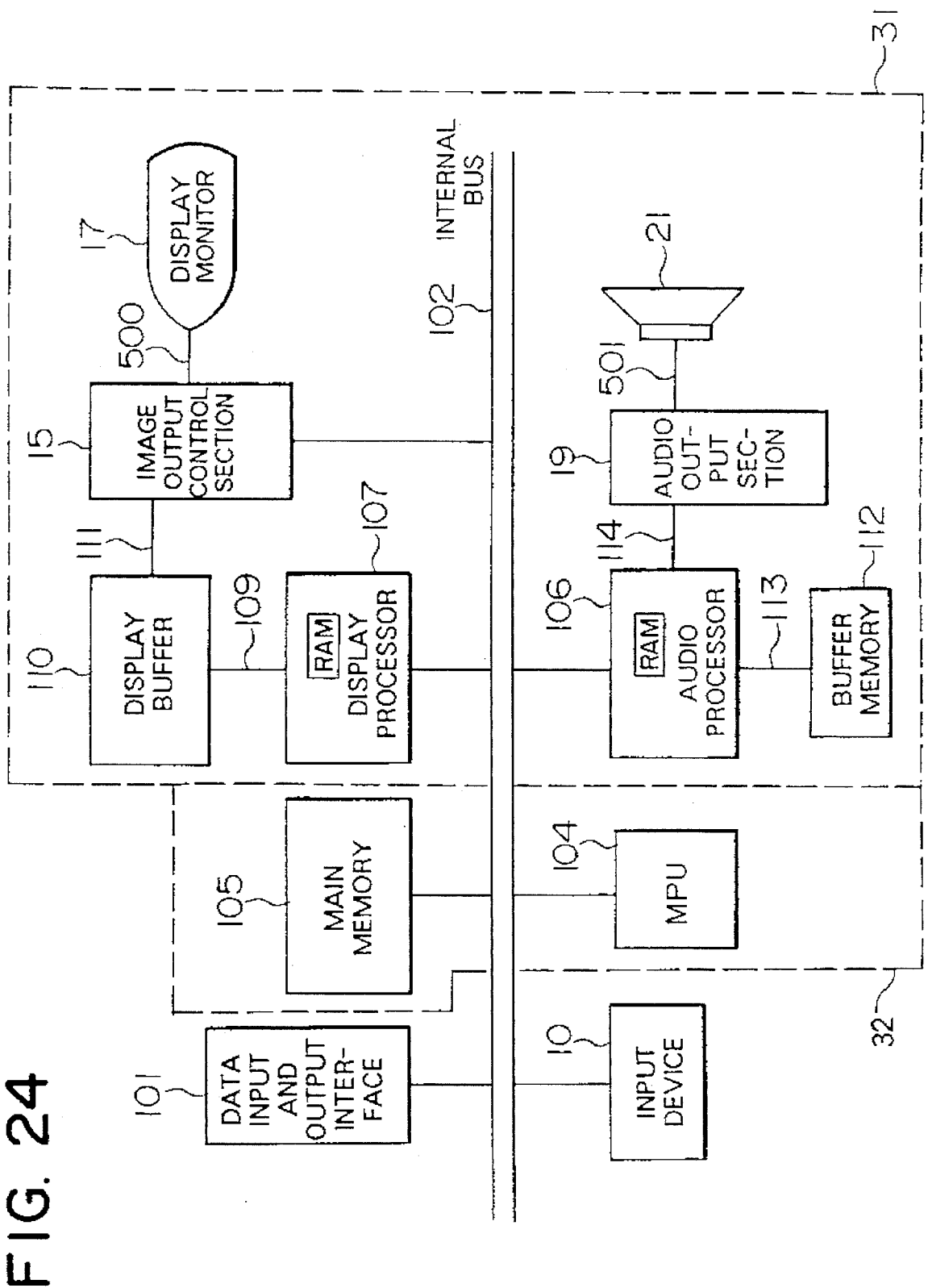
FIG. 24 is a block diagram showing embodiments of a data processing system and a reproduction system.

In FIG. 24, the signal processing section 32 has the function of expanding the compressed image data and audio data. For image data, a display processor 107 incorporating a RAM for storing the program, is connected to the internal bus 102. The display processor 107 is connected to a display buffer 110 for storing the image data through a bus 109. The display buffer 110 outputs the display data 111 to the image output control section 15. On the other hand, for audio data, an audio processor 106 incorporating a RAM for storing the program and so forth is connected to the internal bus 102. The audio processor 106 is connected to a buffer memory 112 for storing the audio data via a bus 113. The audio processor 106 outputs the audio data 114 to the audio output section 19. The data is supplied to MPU 104 in the signal processing section 32 via the data input and output interface 101. Also, the operation command entered by the operator is supplied to the MPU 104 of the signal processing section 32 via the input device 10. The application program for reproduction is stored in a main memory 105. The display processor 107 and the audio processor 106 are controlled by transferring the programs from the MPU 104. The reproduction device 31 has a reproducing function for both the image data and the audio data so that the image output control section 15 outputs a video signal 500 to the display monitor 17. On the other hand, the audio output section 19 outputs an audio signal 501 to the speaker 21.

Next, the practical operation of the construction of FIG. 24 will be described. At first, as set forth above, the reproduction processing apparatus is started. Then, the initiation command for the application program is supplied from the input device 10. Then, the MPU 104 reads out the processing program 6 from the disc memory 30 (FIG. 11) through the data input and output interface 101 and writes in the program RAM incorporated in the display processor 107 and in the program RAM incorporated in the audio processor 106.

Then, the MPU 104 reads out the application program from the disc memory 30 and writes it in the main memory 105. The application program has the program execution file. Thereafter, according to the application program written in the main memory 105, the MPU 104 reads out the stream data, such as compressed and encoded motion picture data, still image data, audio data, and so forth.

The compressed and encoded motion picture data is expanded and decoded in accordance with the data expansion control program written in the program RAM in the display processor 107, in order to form the frame data for display. The frame data for displaying is written in the display buffer 110 through the bus 109. In the image output control section 15, the frame data for displaying written in the display buffer 110 is read out as the display data 111 and converted into the video signal 500 to be displayed on the display monitor 17 and output thereto. The video signal 500 thus supplied to the display monitor 17 is displayed as one frame of display data.

By performing the sequence operation from expansion and decoding of the data in the display processor 107, writing the frame data to the display buffer 110, reading out of the frame data by the image output control section 15 and displaying on the display monitor 17 with high speed, the motion picture can be displayed on the display monitor 17.

On the other hand, the compressed and encoded still image data read out by the MPU 104 is expanded and decoded in the display processor 107 in accordance with the data expansion control program stored in the program RAM of the display processor 107 for forming the displayed still image data. This displayed still image data is written in the display buffer 110 via the bus 109. In the image output control section 15, the displayed still image data written in the display buffer 110 is read out as the display data 111 and converted into the video signal 500 to be displayed on the display monitor 17. The video signal 500 is then output to the display monitor for displaying as a still image.

On the other hand, the compressed and encoded audio data 104 read out by the MPU 104 is expanded and decoded in the audio processor 106 with the buffer memory 112 connected via the bus 113 in accordance with the data expansion control program written in the program RAM in the audio processor 106. The audio data 114 thus formed is output to the audio output section 19. The audio data 114 is then converted into the audio signal 501 in the audio output section 19 and reproduced through the speaker 21 as audible sound.

Next, the fifth embodiment of the multi-media reproduction processing apparatus will be described with reference to FIG. 12. Construction elements in FIG. 11 will be represented by the like reference numerals.

Figure 12:
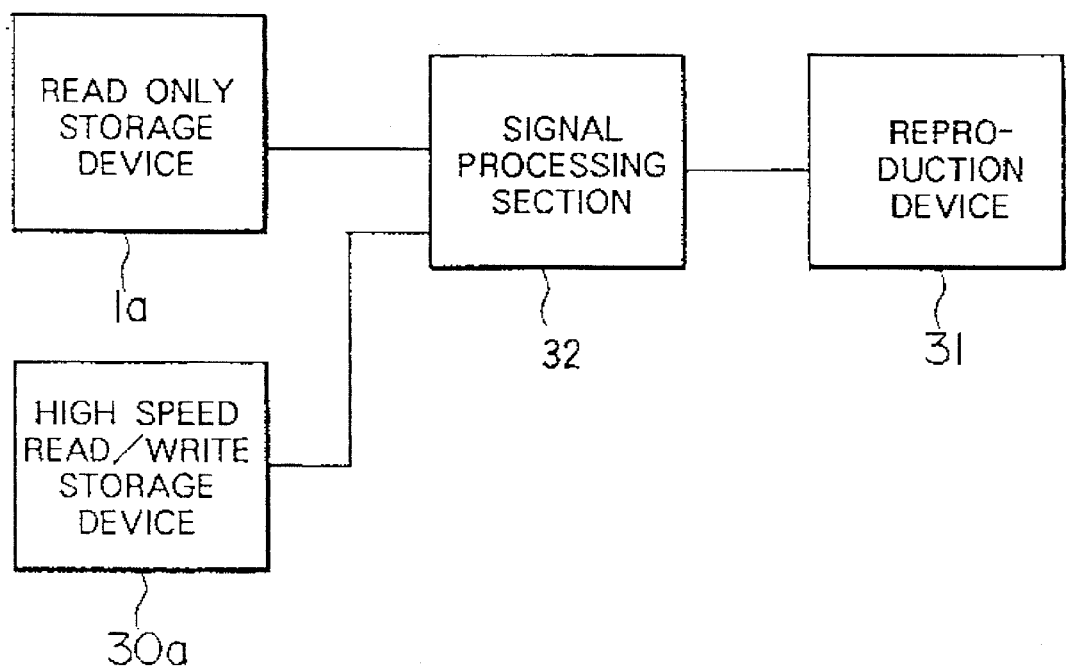
FIG. 12 is a block diagram showing the construction of the fifth embodiment of the multi-media reproduction processing apparatus of the invention.

In FIG. 12, a read only storage device 1a is employed. Also, a high speed read/write storage device 30a which has capability of reading and writing is employed. Other construction elements are the same as those in the embodiment of FIG. 11.

In the embodiment, the read only storage device 1a stores at least one or more compressed and encoded motion picture stream data, compressed and encoded audio stream data and/or compressed and encoded still image stream data. Furthermore, the application program for controlling audio data in synchronism with the motion picture data and sequence of operation for audio output, and the processing program for defining algorithm for expansion and decoding of the compressed and encoded data in the display processor 107 and the audio processor 106, are stored in the read only storage device 1a.

In the embodiment, before the initiation execution of the application program, by previously taking up the reproduction processing apparatus or, in the alternative, entering the command through the input device 10 as shown in FIG. 24, the part of or whole of the processing program stored in the read only storage device 1a is previously written in the high speed read/write storage device 30a as needed. In addition, use of the data transferred to the high speed read/write storage device 30a from the read only storage device 1a in place of the read only storage device 1a, is previously commanded through the input device 10. Then, by initiation of execution of the application program through the input device 10, the equivalent function to the embodiment of FIG. 11 can be performed.

According to the embodiment, when a plurality of application programs to be used are stored in the read only storage device 1a and the processing programs defining the algorithms for expansion and decoding the compressed and encoded data are distinct with respect to respective application programs, it becomes unnecessary to previously write in all of those programs in the high speed read/write storage device 30a. This successfully prevents the capacity of the high speed read/write storage device 30a from being increased.

Furthermore, in the embodiment, when the part of the processing programs defining the algorithm for expansion and decoding the compressed and encoded data are partially in common, taking up operation of the processor section 9 may be simplified by writing in the common data to the high speed read/write storage device 30a beforehand.

Figure 13:
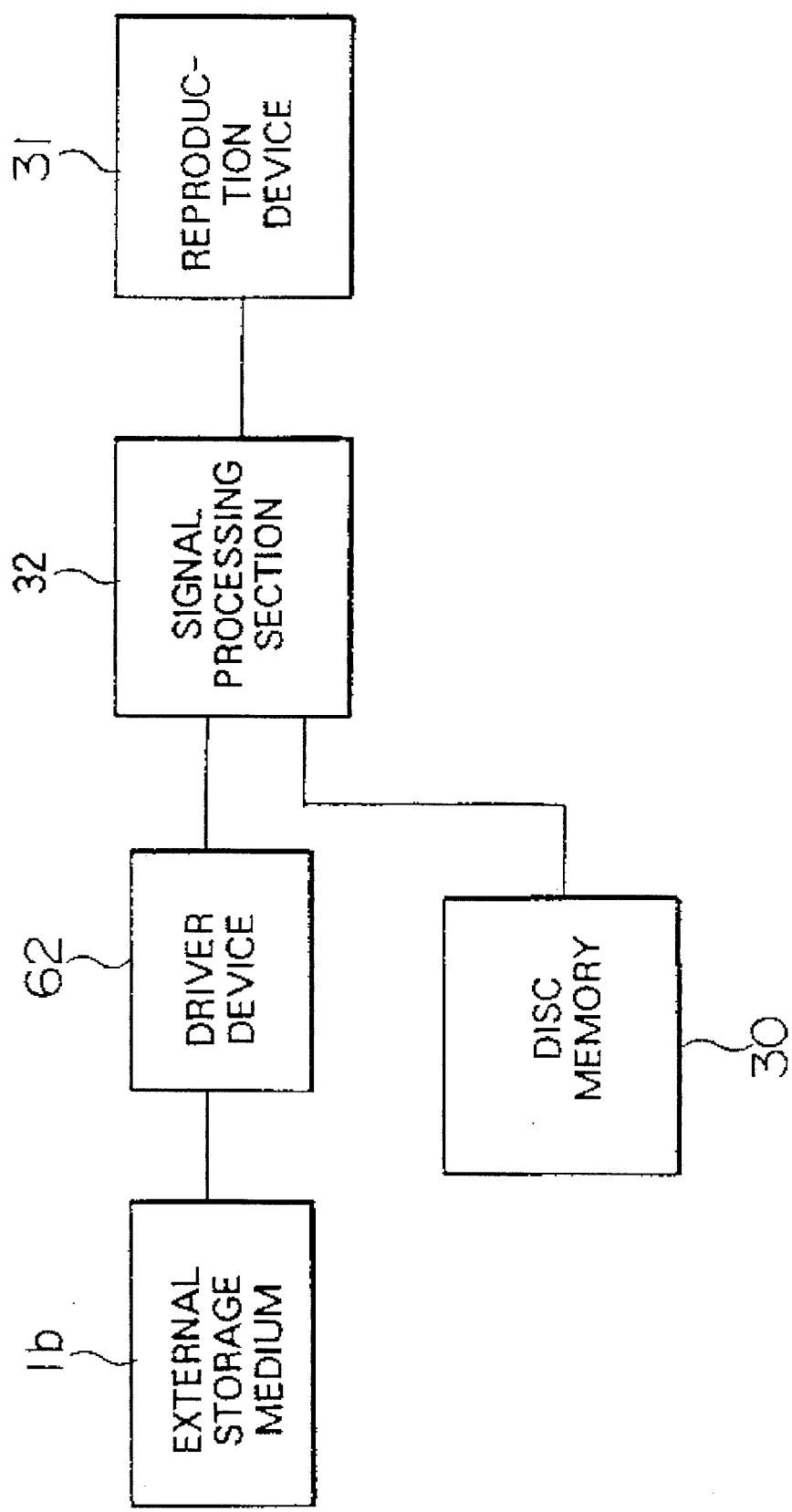
FIG. 13 is a block diagram showing the construction of the sixth embodiment of the multi-media reproduction processing apparatus of the invention.

Next, the sixth embodiment of the multi-media reproduction processing apparatus in accordance with the present invention will be described with reference to FIG. 13. In FIG. 13, the construction elements to those in FIG. 11 will be represented by the same reference numerals. In FIG. 13, a removable external storage medium 1b and a driver device 62 for performing reading from and writing in the external storage medium are employed. Other constructional elements are the same as those in FIG. 11.

In the embodiment, by starting the application program through the input device 10 of FIG. 24, the driver device 62 outputs the application program, the motion picture stream data containing the compressed and encoded data, the audio stream data containing the compressed and encoded data and/or the still image stream data containing the compressed and encoded data to perform substantially the equivalent operation as those described with respect to the embodiment of FIG. 11. At this time, the common part of the processing programs in the external storage medium 1b is previously stored in the disc memory 30.

According to the embodiment, since a large storage medium is replaceable, the application program can be supplied from an external section. Also, by previously storing common data for use in the application program in the disc memory 30, it is advantageous in that each of the different application programs stored in the storage medium can be executed at a high speed.

Figure 14:
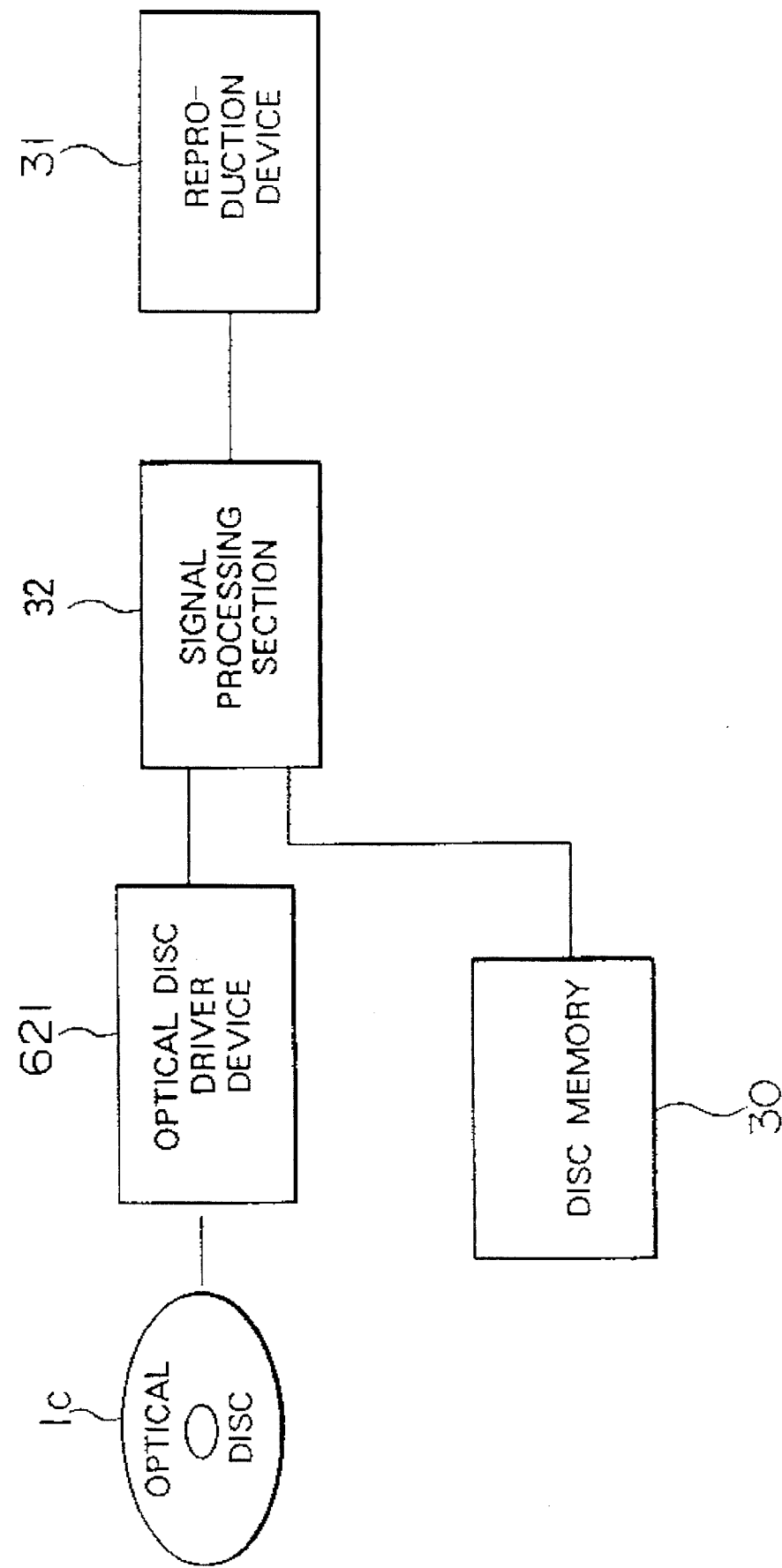
FIG. 14 is a block diagram showing the construction of the seventh embodiment of the multi-media reproduction processing apparatus of the invention.

Next, the seventh embodiment of the multimedia reproduction processing apparatus in accordance with the present invention will be described with reference to FIG. 14. In FIG. 14, the construction elements in FIG. 13 will be represented by like reference numerals. In FIG. 14, an optical disc 1c is employed. In order of performing reading out and writing in the optical disc 1c, an optical disc driver device 621 is also employed. Other constructional elements are the same as those in the embodiment of FIG. 13.

The operation of the embodiment is substantially the same as the sixth embodiment of FIG. 13, except for the optical disc 1c is used in place of the external storage medium.

With the embodiment, since the optical disc 1c is employed as the replaceable external storage medium, the application program can be easily replaced with the optical disc 1c. Furthermore, when the standard format of the CD-ROM is employed in the optical disc, high commercial circularity can be realized.

Figure 15:
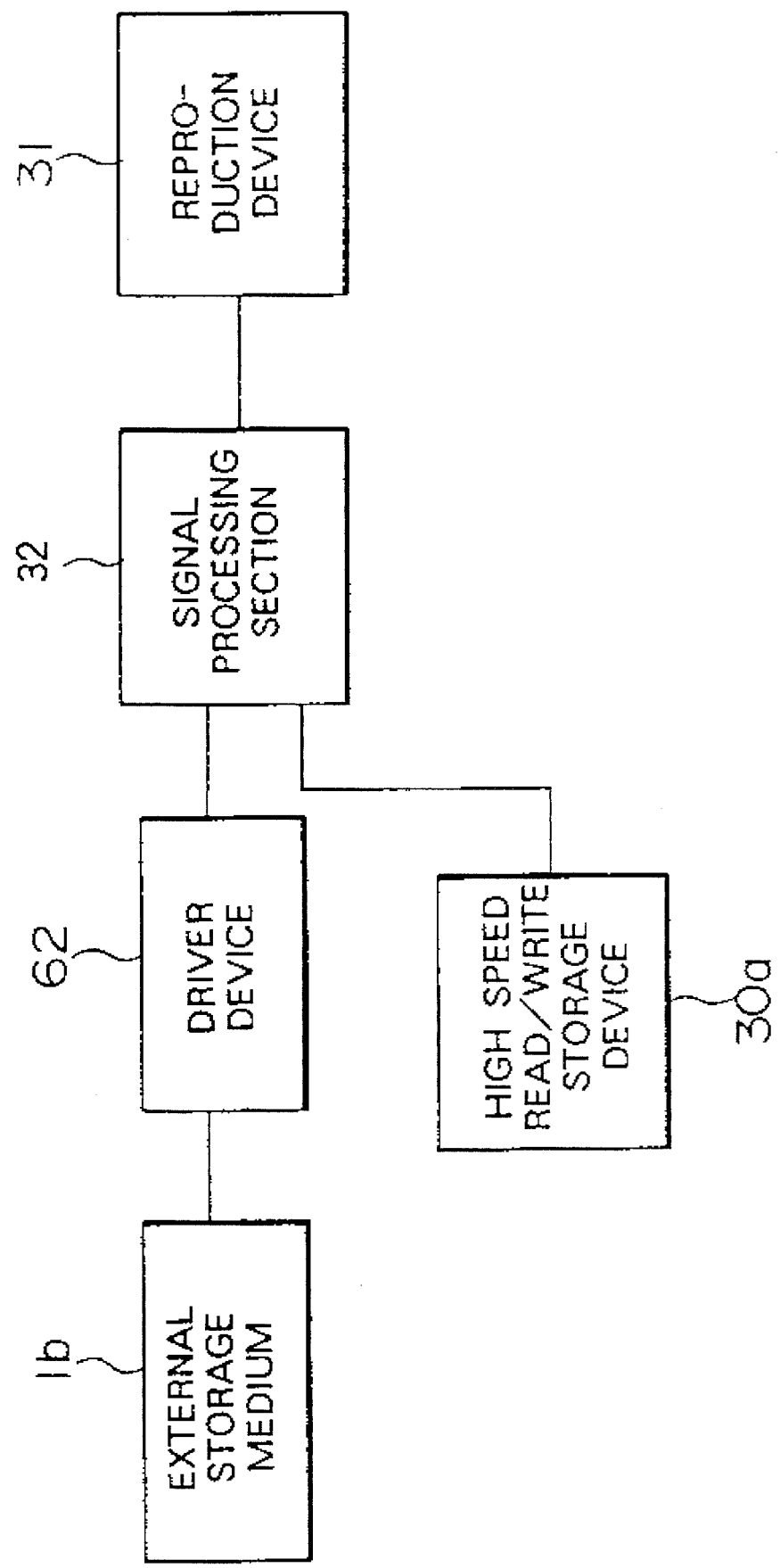
FIG. 15 is a block diagram showing the construction of the eighth embodiment of the multi-media reproduction processing apparatus of the invention.

Next, the eighth embodiment of the multi-media reproduction processing apparatus in accordance with the present invention will be described in reference to FIG. 15. In FIG. 15, the construction elements in FIG. 13 will be represented by the like reference numerals. In FIG. 15, the high speed read/write storage device 30a which can read out and write in, is employed. Other construction elements are the same as those in the embodiment of FIG. 13.

In this embodiment, before the initiation execution of the application program, by entering the command through the input device 10 as shown in FIG. 24, the part or whole of the processing program stored in the external storage medium 1b is previously written in the high speed read/write storage device 30a as needed. Then, by initiation of execution of the application program through the input device 10, the equivalent function to the embodiment of FIG. 13 can be performed.

With the present embodiment, the large capacity of the storage medium is replaceable, and the application program can be supplied externally. Therefore, by writing in the processing program to be used by the application program in the high speed read/write storage device 30a beforehand, the application programs on different recording mediums can be executed at high speed. Furthermore, even when the processing programs to be used are differentiated with respect to the application programs, all of those processing programs are not required to be previously written in the high speed read/write device 30a. Therefore, it can prevent the capacity of the high speed read/write storage device 30a from being unnecessarily increased.

Figure 16:
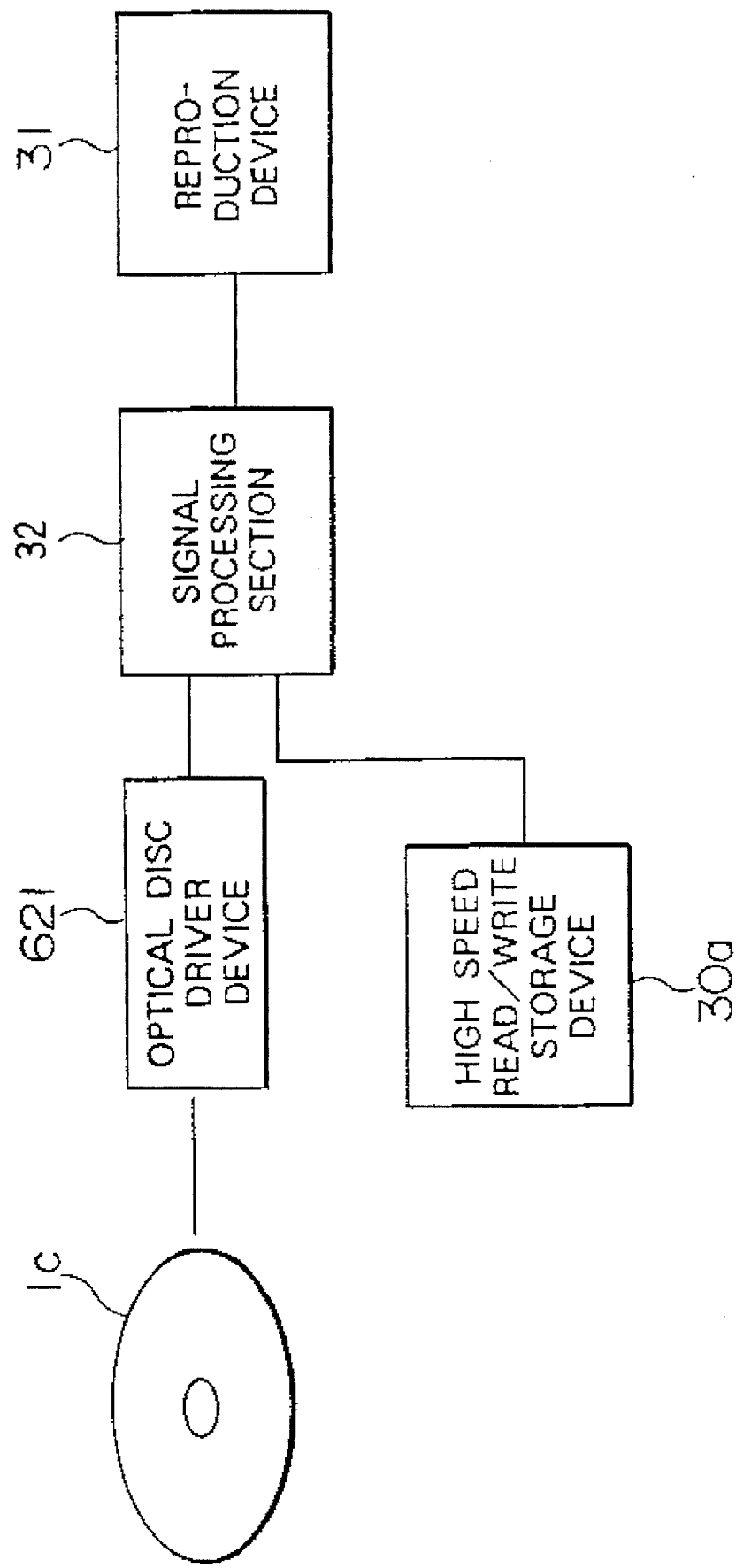
FIG. 16 is a block diagram showing the construction of the ninth embodiment of the multi-media reproduction processing apparatus of the invention.

Next, the ninth embodiment of the multi-media reproduction processing apparatus in accordance with the present invention will be described with reference to FIG. 16. In FIG. 16, the construction elements in FIG. 15 will be represented by the like reference numerals.

In FIG. 16, the optical disc 1c is employed. Therefore, the optical disc driver device 621 for reading out and writing in the optical disc 1c is also employed. Other construction elements are the same as those in the embodiment of FIG. 15.

The operation of the embodiment is substantially the same as the sixth embodiment of FIG. 15, except for the optical disc 1c is used in place of the external storage medium.

With the embodiment, since the optical disc 1c is employed as the replaceable external storage medium, the application program can be easily replaced with the optical disc 1c. Furthermore, when the standard format of the CD-ROM is employed in the optical disc 1c, high commercial circularity can be realized. Furthermore, by writing in the processing program to be used by the application program in the high speed read/write storage device 30a beforehand, the application programs on different recording medium can be executed at high speed. Also, even when the processing programs to be used are differentiated with respect to the application program, all of those processing programs are not required to be written in the high speed read/write device 30a beforehand. Therefore, it can prevent the capacity of the high speed read/write storage device 30a from being unnecessarily increased.

Figure 17:
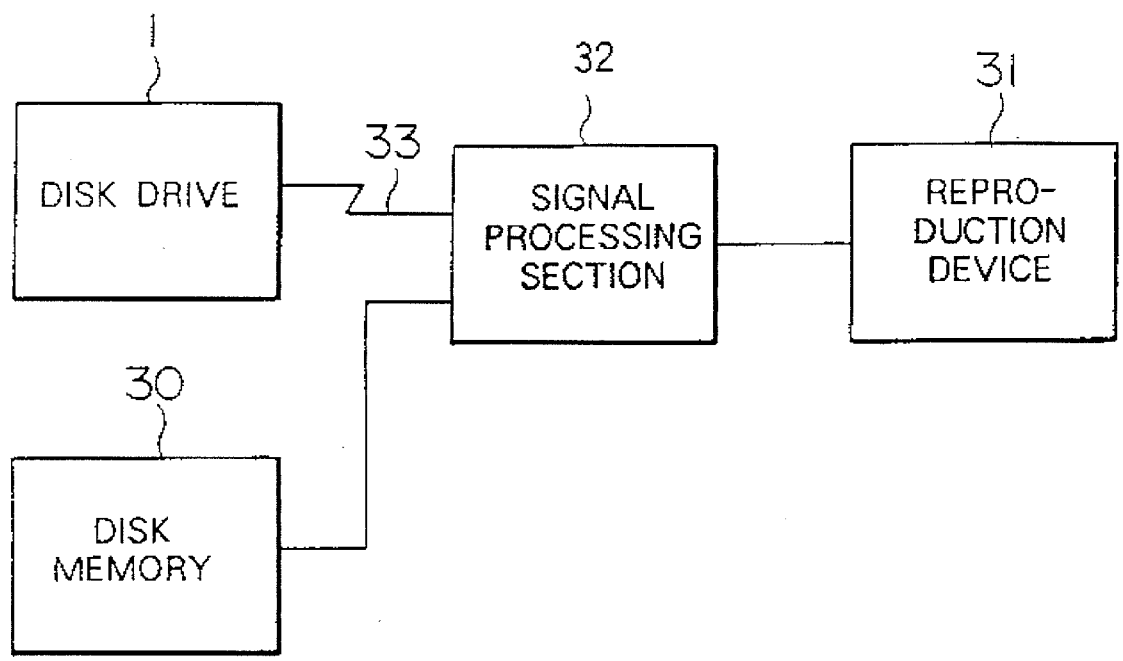
FIG. 17 is a block diagram showing the construction of the tenth embodiment of the multi-media reproduction processing apparatus of the invention.

Next, the tenth embodiment of the multi-media reproduction processing apparatus in accordance with the present invention will be described with reference to FIG. 17. In FIG. 17, the construction elements in FIG. 11 are represented by the like reference numerals.

In FIG. 17, the disc drive 1 and the signal processing section 32 are connected through a communication network 33. Other construction elements are the same as those in the embodiment of FIG. 11.

The operation of this embodiment is substantially the same as those in the embodiment of FIG. 11. However, since the disk drive 1 is provided externally, each of the stream data processing devices are not required to have large capacity memory within the device. Furthermore, through the communication network 33, common data can be used by a plurality of the reproduction processing apparatuses. In such case, since the data for starting operation of the signal processing section 32 can be maintained in the disc memory 30, it is not necessary to use the communication network 33 upon taking up of the signal processing section 32. Therefore, the cost for data communication can be minimized.

Figure 18:
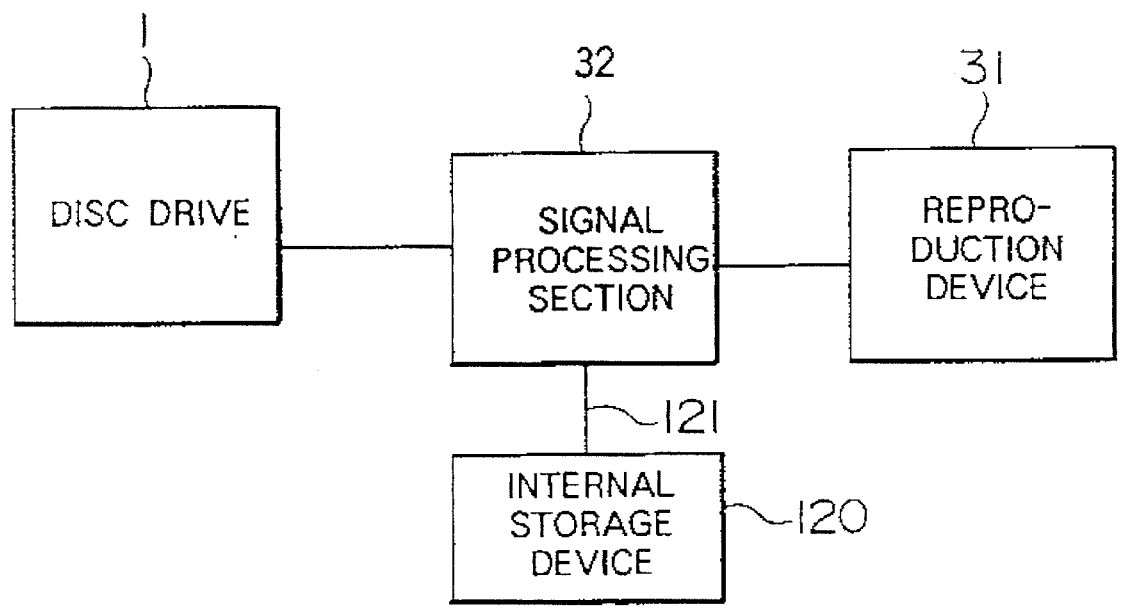
FIG. 18 is a block diagram showing the construction of the eleventh embodiment of the multi-media reproduction processing apparatus of the invention.

Next, the eleventh embodiment of the multi-media reproduction processing apparatus in accordance with the present invention will be described in reference to FIG. 18. In FIG. 18, the construction elements of FIG. 11 will be represented by the like reference numerals.

In FIG. 18, an internal storage device 120 in the signal processing section 32 and a data bus 121 for outputting data in the internal storage device 120 are employed. The data bus 121 is connected to the internal bus 102 shown in FIG. 24.

In the embodiment, the internal storage device 120 has the data with the same content as the data stored in the disc memory 30 of the embodiment illustrated in FIG. 11. Therefore, the embodiment performs substantially the same operation to the embodiment of FIG. 11, except for the data being used is stored in the internal storage device 120.

According to the embodiment, by using the internal storage device 120 of the signal processing device 32, it becomes unnecessary to provide the external storage device. This contributes to saving the overall cost of the stream data processing apparatus.

Figure 19:
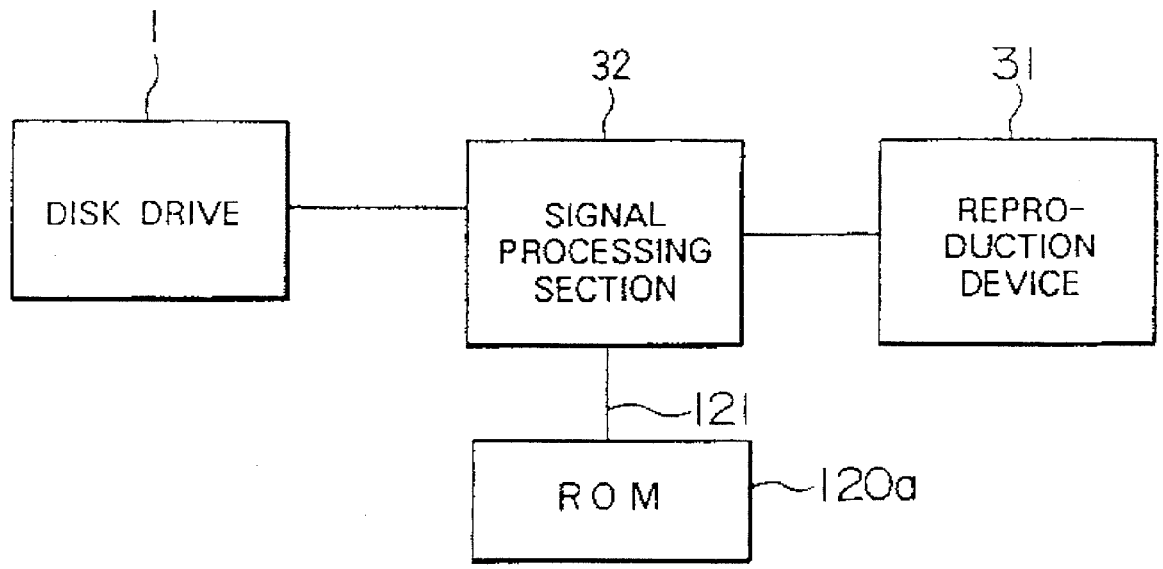
FIG. 19 is a block diagram showing the construction of the twelfth embodiment of the multi-media reproduction processing apparatus of the invention.

Next, the twelfth embodiment of the multi-media reproduction processing apparatus in accordance with the present invention will be described in reference to FIG. 19. In FIG. 19, the construction elements in FIG. 18 will be represented by the like reference numerals. In FIG. 19, a ROM 120a is used as the internal storage device 120.

With this embodiment, when the data to be stored in the storage device beforehand is fixed, by using the ROM 120a as the storage device, smaller installation capacity can be realized in installation of the storage device in the signal processing section 32. Furthermore, since the storage device comprises the semiconductor storage element, the signal processing section 32 can perform the reading out operation only by electric operation without requiring the mechanical operation. This contributes to speeding up of reading out of the data.

Figure 20:
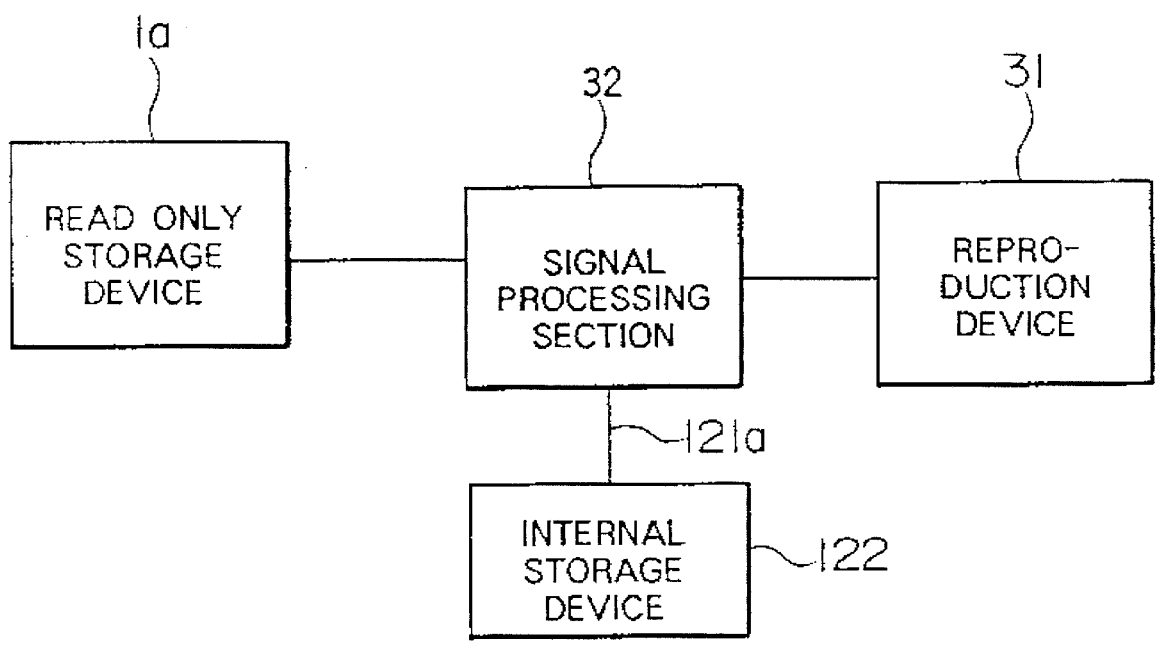
FIG. 20 is a block diagram showing the construction of the thirteenth embodiment of the multi-media reproduction processing apparatus of the invention.

The thirteenth embodiment of the multi-media reproduction processing apparatus in accordance with the present invention will be described with reference to FIG. 20. In FIG. 20, the construction elements in FIG. 12 will be represented by the like reference numerals. In FIG. 20, an internal storage device 122 which is incorporated in the signal processing section 32 and has reading and writing capability, is used. The internal storage device 122 is connected to the internal bus 102 shown in FIG. 24 via the data bus 121a. The embodiment has the internal storage device 122 having the same content as the data stored in the high speed read/write storage device 30a of FIG. 12. Other operations are the same as that of the embodiment of FIG. 12.

The embodiment employs the internal storage device 122 as the storage device, and a plurality of the application programs are stored in the read only storage device 1a. In the embodiment, even when the processing programs to be used with respect to the application programs are different, it is unnecessary to write in all processing programs in the internal storage device 122 beforehand. Therefore, unnecessary increase of the capacity of the internal storage device 122 can be successfully prevented. Furthermore, in the embodiment, when the processing programs to be used for respective applications have a common part, operation for starting operation of the signal processing section 32 can be simplified even when the different type of the application programs are initiated, by previously storing the common data in the internal storage device 122. In addition, by using the internal storage device 122 in the signal processing section 32 as the storage device, it is unnecessary to add the external storage device. This contributes lowering of the cost of the overall stream data processing apparatus.

Figure 21:
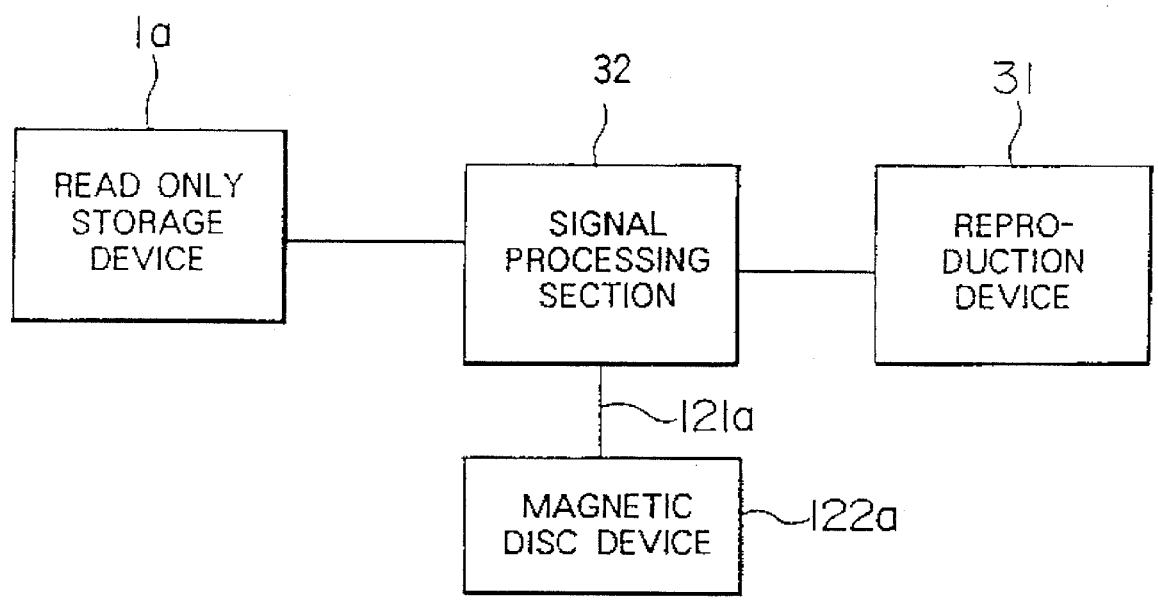
FIG. 21 is a block diagram showing the construction of the fourteenth embodiment of the multi-media reproduction processing apparatus of the invention.

The fourteenth embodiment of the multi-media reproduction processing apparatus in accordance with the present invention is illustrated in FIG. 21. In FIG. 21, the construction elements to those in FIG. 20 will be represented by the like reference numerals. In the embodiment of FIG. 21, a magnetic disc device 122a is employed. The embodiment performs substantially the same operation to those of FIG. 20 except for the magnetic disc device 122a being used as the internal storage device 122.

With the embodiment, by employing the magnetic disc device 122a as the storage device, a relatively large capacity of storage device can be easily realized. Therefore, part or whole of the motion picture stream data, the audio stream data, the still image data and the process program stored in the read only storage device 1a, can be used by transferring to the magnetic disc device 122a for improving process speed of the overall stream data processing apparatus.

Figure 22:
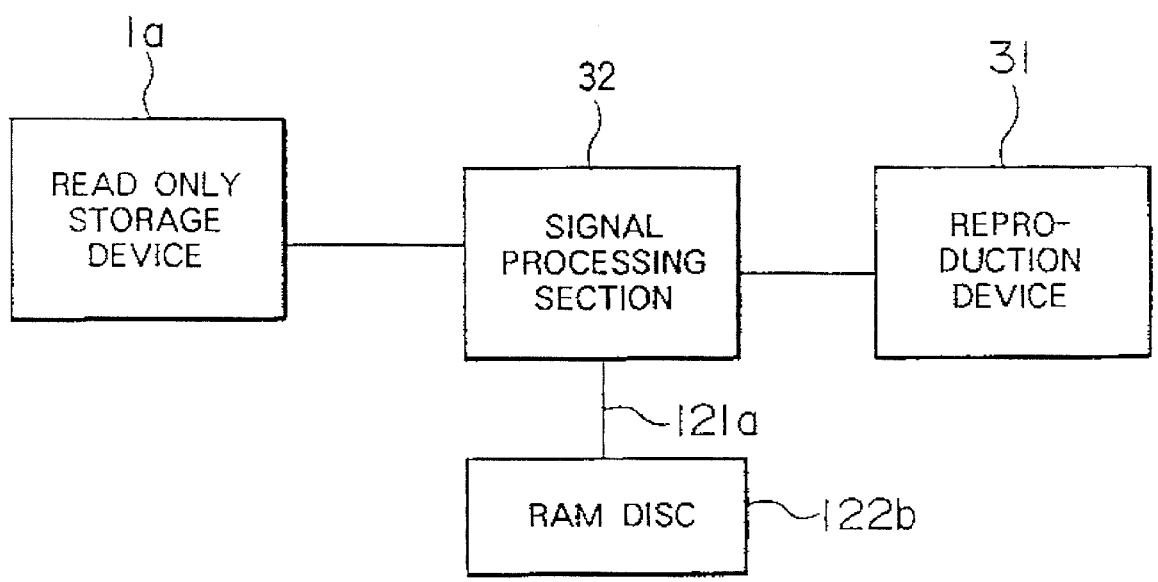
FIG. 22 is a block diagram showing the construction of the fifteenth embodiment of the multi-media reproduction processing apparatus of the invention.

The fifteenth embodiment of the multi-media reproduction processing apparatus in accordance with the present invention is illustrated in FIG. 22. In FIG. 22, the construction elements of FIG. 20 will be represented by the like reference numerals. In FIG. 22, a RAM disc 122b is employed. The embodiment performs substantially the same operation as those of FIG. 20, except for using of the RAM disc 122b.

With the embodiment, by using the RAM disc 122b as the storage device, the storage device can be installed in the signal processing section 32 with smaller installation capacity. Furthermore, since the storage device comprises the semiconductor storage element, the signal processing section 32 can perform reading and writing operation purely in electric operation without requiring any mechanical operation. Therefore, reading out and writing of the data can be done at high speed.

Figure 23:
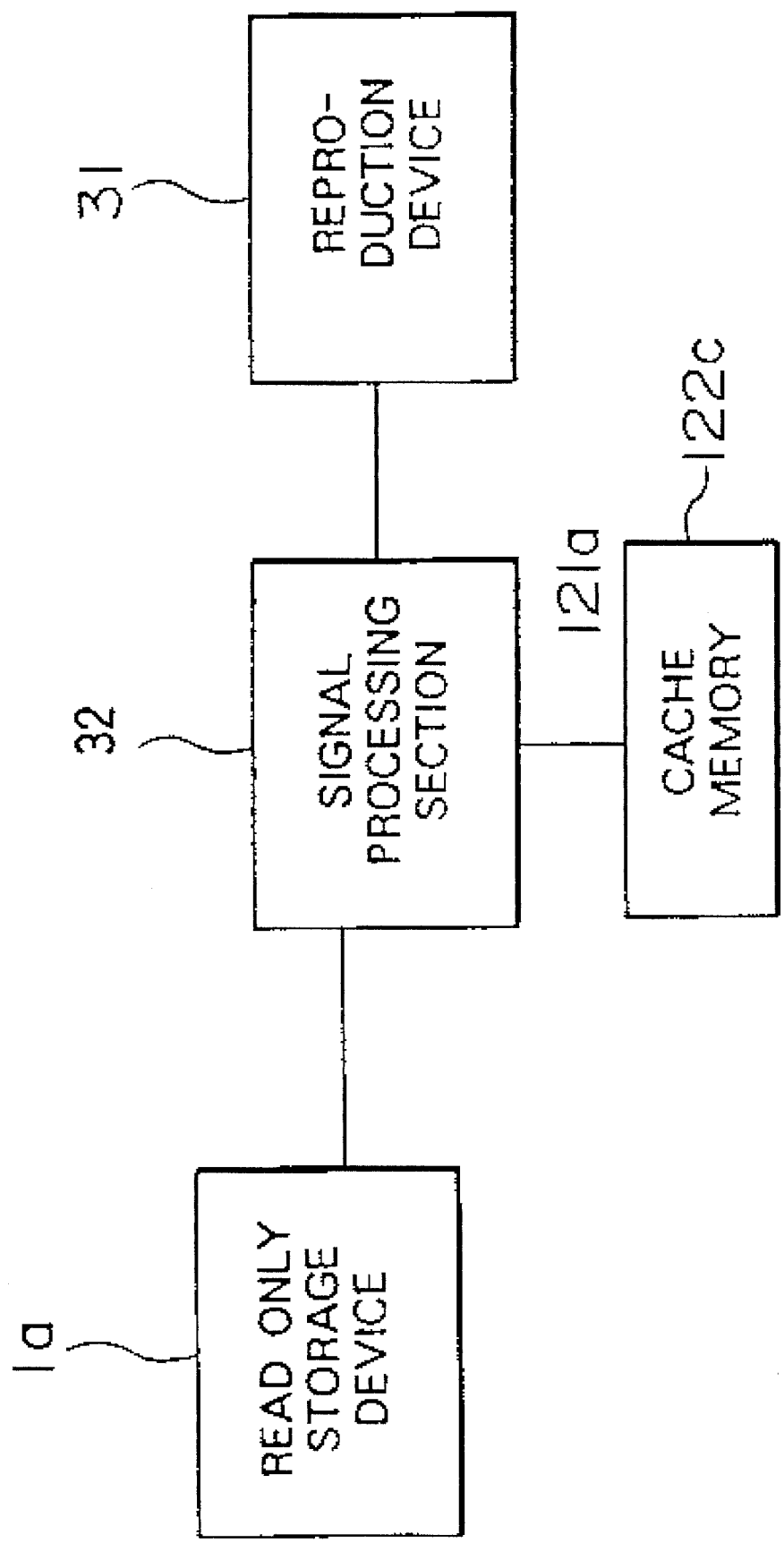
FIG. 23 is a block diagram showing the construction of the sixteenth embodiment of the multi-media reproduction processing apparatus of the invention.

The sixteenth embodiment of the multi-media reproduction processing apparatus in accordance with the present invention is illustrated in FIG. 23. In FIG. 23, the construction elements in FIG. 20 will be represented by the like reference numerals. In FIG. 23, a cache memory 122c is employed. The embodiment performs substantially the same operation as those of FIG. 20, except for using of the cache memory 122c.

With the embodiment, since the MPU 104, the display processor 107, the audio processor 106 may use the cache memory 122c of FIG. 24, starting up of the signal processing section 32 can be much quicker. In addition, by providing the cache memories independently with respective to the MPU 104, the display processor 107 and the audio processor 106 of FIG. 24, the process speed of the signal processing section 32 can be significantly increased.

As set forth, it becomes possible to make judgement whether the processing program and the application program for processing the stream data is present or not in the high speed storage device. Also, when the processing program for processing the stream data is not present in the high speed storage device, the necessary processing program can be transferred thereto. On the other hand, if present, the processing program can be used.

Therefore, by starting up the process of stream data using the processing program stored in the storage device, starting up period from initiation of process of the application program to starting of process of the stream data can be shortened.

What is claimed is:

1. A multi-media reproduction processing apparatus, comprising:

data supply means for reading out data from a loaded storage medium and outputting the read out data;

at least one reproducing means having a plurality of reproduction modes, describing a respective data compression algorithm and data format, for reproducing the data read out from said storage medium in accordance with one of said plurality of reproduction modes;

mode data separation means for separating mode discrimination data for identifying one of said plurality of said reproduction modes from said data for at least every opening of a file in said data;

mode discrimination means for discriminating said one of said reproduction modes on the basis of said mode discrimination data and outputting mode information identifying recording system of said one of said reproduction modes and an algorithm for reproduction for said at least every opening of a file in said data; and mode selecting means, provided in said reproduction means, for selecting one of said plurality of said reproduction modes depending upon said mode information for said at least every opening of a file in said data.

2. A multi-media reproduction processing apparatus as set forth in claim 1, wherein said reproducing means reproduces audio data and image data.

3. A multi-media reproduction processing apparatus as set forth in claim 2, wherein said reproducing means includes at least a processing section for performing reproduction processing of data with respect to a plurality of said reproduction modes and a mode control section for controlling said processing section depending upon said mode information.

4. A multi-media reproduction processing apparatus as set forth in claim 3, wherein said reproducing means further includes at least output means for outputting said audio data as audio data signals and display means for outputting said image data as an video image.

5. A multi-media reproduction processing apparatus, comprising:

data supply means for reading out data from a loaded storage medium and outputting the data;

at least one reproducing means having a plurality of reproduction modes, describing a respective data compression algorithm and data format, for reproducing the data read out from said storage medium in accordance with one of said plurality of reproduction modes;

mode supply means for outputting mode information identifying a recording system of said one of said reproduction modes and an algorithm for reproduction for at least every opening of a file in said data; and mode selecting means, provided in said reproduction means, for selecting one of said plurality of said reproduction modes in accordance with said mode information for said at least every opening of a file in said data.

6. A multi-media reproduction processing apparatus, comprising:

data supply means for reading out multi-media data including image data, audio data and a processing program stored in a storage medium, according to one of a plurality of reproduction modes, describing a respective data compression algorithm and data format, and outputting said multi-media data;

mode data separation means for separating said multimedia data into the image data, the audio data, the processing program and mode discrimination data identifying one of said plurality of said reproduction modes for at least every opening of a file in said data;

an image data processing section for performing data processing for the image data with a data structure in the one of said reproduction modes identified by said mode discrimination data and generating a frame data of the image for said at least every opening of a file in said data;

an image output control section for outputting said frame data from said image data processing section as a display signal;

an audio data processing section for decoding the encoded audio data depending upon the reproduction mode identified by said mode discrimination data for said at least every opening of a file in said data;

an audio output section for converting the audio data from said audio processing section into an analog voice signal to output to a speaker;

data processing means for controlling said image data processing section and said audio data processing section by said processing program for said at least every opening of a file in said data;

mode discrimination means for discriminating the one of said reproduction modes on the basis of said mode discrimination data for said at least every opening of a file in said data;

mode supply means for accepting externally entered mode information identifying recording system of the one of said reproduction modes and algorithm for reproduction for said at least every opening of a file in said data;

selection means for selectively providing said mode information from said mode discrimination means and said mode supply means for said at least every opening of a file in said data;

mode selecting system means provided in said image data processing section and said audio data processing section, for selecting one of said plurality of said reproduction modes according to said mode information for said at least every opening of a file in said data; and mode control section for controlling said image data processing section and said audio data processing section based on said mode information for said at least every opening of a file in said data.

7. A multi-media reproduction processing apparatus as set forth in claim 6, wherein said image data processing section comprises, at least:

a mode dependent operation control program memory for storing a plurality of algorithms for reproduction to be selected by a mode control signal output from said mode selecting means and indicative of the reproduction mode for said at least every opening of a file in said data, a first arithmetic processing section for performing image processing converting the format corresponding to the reproduction mode having the selected algorithm for said at least every opening of a file in said data, and a video random access memory for storing image data reproduced with said algorithm.

8. A multi-media reproduction processing apparatus as set forth in claim 7, wherein said first arithmetic processing section has a plurality of arithmetic sections respectively adapted to a plurality of said reproduction modes so as to avoid the necessity of a conversion of format corresponding to selected reproduction mode having the selected algorithm.

9. A multi-media reproduction processing apparatus as set forth in claim 6, wherein said audio data processing section comprises, at least:

a mode dependent operation control program memory storing a plurality of algorithms for reproduction to be selected by the mode signal output from said mode selecting means and indicative of the reproduction mode for said at least every opening of a file in said data, a second arithmetic processing section for performing audio processing with said algorithm corresponding to said reproduction mode for said at least every opening of a file in said data, and an audio data memory for storing the audio data reproduced by said algorithm.

10. A multi-media reproduction processing apparatus as set forth in claim 6, wherein said data processing means comprises:

storage means for storing processing program to be used for reproduction process of the stream data for said at least every opening of a file in said data, discriminating means for determining whether or not the processing program is present in said storage means for said at least every opening of a file in said data, and transferring means for transferring said processing program from said data supplying means to said memory means when processing program is not present for said at least every opening of a file in said data.

11. A multi-media reproduction processing apparatus as set forth in claim 10, wherein said storage means stores the stream data.

12. A multi-media reproduction processing apparatus as set forth in claim 10, wherein said storage means is provided in said data processing means.

13. A multi-media reproduction processing apparatus as set froth in claim 12, wherein said storage means comprises a read-only memory employing a semiconductor element.

14. A multi-media reproduction processing apparatus as set forth in claim 12, wherein said memory means comprises a random access memory employing a semiconductor element.

15. A multi-media reproduction processing apparatus as set forth in claim 12, wherein said memory means comprises a cache memory.

16. A multi-media reproduction processing apparatus as set forth in claim 12, wherein said storage means is of a magnetic disk type.

17. A multi-media reproduction processing apparatus as set forth in claim 10, wherein said storage means is of a data reading and writing type.

18. A multi-media reproduction processing apparatus as set forth in claim 6, wherein the storage medium included in said data supply means comprises an external read only storage device.

19. A multi-media reproduction processing apparatus as set forth in claim 18, wherein said external read only storage device is of an optical disk type.

20. A multi-media reproduction processing apparatus as set forth in claim 6, wherein said storage medium included in said data supply means comprises an external read/write storage device.

21. A multi-media reproduction processing apparatus as set forth in claim 20, which further comprises an identification code reading means associated with said external storage medium for reading out a code identifying the type of said external storage medium.

22. A multi-media reproduction processing apparatus as set forth in claim 6, wherein said data supply means and said data processing means are connected through a communication network.

23. A disc drive device, comprising:
data supply means for reading out data from a storage medium in accordance with one of a plurality of reproduction modes, describing a respective data compression algorithm and data format, and outputting said data;

data separation means for separating mode discrimination data for identifying the one of said plurality of reproduction modes from said data for at least every opening of a file in said data;

mode discrimination means for discriminating a specific reproduction mode among said plurality of said reproduction modes on the basis of said mode discrimination data and outputting a mode information identifying recording system of the specific reproduction mode and algorithm for reproduction for said at least every opening of a file in said data; and selecting means for selecting a reproduction mode to said specific reproduction mode according to said mode information for said at least every opening of a file in said data.

24. A switching device, comprising:
data supply means for reading out data from a storage medium in accordance with one of a plurality of reproduction modes, describing a respective data compression algorithm and data format, and outputting said data for at least every opening of a file in said data;

data separation means for separating mode discrimination data for identifying one of a plurality of reproduction modes from said data for said at least every opening of a file in said data;

mode discrimination means for discriminating a specific reproduction mode from among said plurality of said reproduction modes on the basis of said mode discrimination data and outputting a mode information identifying recording system of said specific reproduction mode and algorithm for reproduction for said at least every opening of a file in said data; and selecting means for selecting reproduction modes to said specific reproduction mode according to said mode information for said at least every opening of a file in said data.

25. A multi-media reproduction processing apparatus, comprising:
data supply means for reading out multi-media data containing image data, audio data and a processing program stored on a storage medium according to one of a plurality of reproduction modes, describing a respective data compression algorithm and data format, and outputting said multi-media data for at least every opening of a file in said data;

data separation means for separating respective ones of said image data, said audio data and said processing program from said multi-media data for said at least every opening of a file in said data;

an image data processing section for performing data processing for said image data with a data structure of a reproduction mode identified by mode discrimination data and generating frame data for a video image for said at least every opening of a file in said data;

an image output control section for outputting said frame data from said image data processing section to a display monitor as a display signal;

an audio data processing section for decoding a encoded audio data depending upon the reproduction mode identified by said mode discrimination data for said at least every opening of a file in said data;

an audio output section for converting an audio data from said audio data processing section into an analog voice signal to output to a speaker;

data processing means for controlling sid image data processing section and said audio data processing section with said processing program and outputting said mode discrimination signal identifying one of a plurality of reproduction modes based on said processing program for said at least every opening of a file in said data;

mode selecting means provided in said image data processing section and said audio data processing section for selecting one of said plurality of reproduction modes according to said mode discrimination data for said at least every opening of a file in said data; and mode control section for controlling said image data processing section and said audio data processing section depending upon said mode discrimination data for said at least every opening of a file in said data.

26. A multi-media reproduction processing apparatus, comprising:
data supply means for supplying multi-media data;

at least one reproducing means having a plurality of reproduction modes, describing a respective data compression algorithm and data format, for reproducing data read out from a storage medium in accordance with one of said plurality of reproduction modes;

mode judgement means for determining a reproduction mode from the multi-media data, for outputting mode information indicative of a recording format and an algorithm for reproduction in the reproduction mode for at least every opening of a file in said data; and mode selecting means provided in said reproduction means, for selecting one of said plurality of reproduction modes depending upon said mode information for said at least every opening of a file in said data.

27. A multi-media reproduction processing apparatus according to claim 26, wherein said mode selecting means includes:

reproduction mode storing means for storing at least one reproduction mode information for said at least every opening of a file in said data;

reproduction mode accepting means for accepting said at least one reproduction mode information for said at least every opening of a file in said data; and reproduction setting means for setting said at least one reproduction mode information supplied from said reproduction mode storing means to said reproduction mode accepting means for said at least every opening of a file in said data.

28. A multi-media reproduction processing apparatus, comprising:

data supply means for supplying multi-media data;

at least one processor for processing said multi-media data; and memory means connected to said processor, wherein said processor processes a reproduction model describing a respective data compression algorithm and data format, judged according to mode judging data stored in said memory for at least every opening of a file in said data, an appropriate one of said reproduction modes is selected from the plurality of reproduction modes according to a result of the determination stored in said memory means for said at least every opening of a file in said data, and multi-media data supplied from said data supply means is reproduced in accordance with said selected reproduction mode for said at least every opening of a file in said data.

29. A multi-media reproduction processing apparatus according to claim 28, wherein said reproduction mode specifies a recording format and an algorithm for reproduction for said at least every opening of a file in said data.

30. A multi-media reproduction processing apparatus, comprising:

data supply means for reading out data from a loaded storage medium and outputting the read out data;

at least one reproducing means having a plurality of reproduction modes, describing a respective data compression algorithm and data format, for reproducing the data read out from said storage medium in accordance with one of said plurality of reproduction modes;

mode data separation means for separating mode discrimination data for identifying one of said plurality of said reproduction modes from said data for at least every opening of a file in said data and removing the storage medium;

mode discrimination means for discriminating said one of said reproduction modes on the basis of said mode discrimination data and outputting mode information identifying recording system of said one of said reproduction modes and an algorithm for reproduction for said at least every opening of a file in said data and removing the storage medium; and mode selecting means, provided in said reproduction means, for selecting one of said plurality of said reproduction modes depending upon said mode information for said at least every opening of a file in said data and removing the storage medium.

31. A multi-media reproduction processing apparatus as set forth in claim 30, wherein said reproducing means reproduces audio data and image data.

32. A multi-media reproduction processing apparatus as set forth in claim 31, wherein said reproducing means includes at least a processing section for performing reproduction processing of data with respect to a plurality of said reproduction modes and a mode control section for controlling said processing section depending upon said mode information.

33. A multi-media reproduction processing apparatus as set forth in claim 32, wherein said reproducing means further includes at least output means for outputting said audio data audio data signals and display means for outputting said image data as an video image.

34. A multi-media reproduction processing apparatus, comprising:

data supply means for reading out data from a loaded storage medium and outputting the data;

at least one reproducing means having a plurality of reproduction modes, describing a respective data compression algorithm and data format, for reproducing the data read out from said storage medium in accordance with one of said plurality of reproduction modes;

mode supply means for outputting mode information identifying a recording system of said one of said reproduction modes and an algorithm for reproduction for at least every opening of a file in said data and removing the storage medium; and mode selecting means, provided in said reproduction means, for selecting one of said plurality of said reproduction modes in accordance with said mode information for said at least every opening of a file in said data and removing the storage medium.

35. A multi-media reproduction processing apparatus, comprising:

data supply means for reading out multi-media data including image data, audio data and a processing program stored in a storage medium, according to one of a plurality of reproduction modes, describing a respective data compression algorithm and data format, and outputting said multi-media data;

mode data separation means for separating said multimedia data into the image data, the audio data, the processing program and mode discrimination data identifying one of said plurality of said reproduction modes for at least every opening of a file in said data and removing the storage medium;

an image data processing section for performing data processing for the image data with a data structure in the one of said reproduction modes identified by said mode discrimination data and generating a frame data of the image for said at least every opening of a file in said data and removing the storage medium;

an image output control section for outputting said frame data from said image data processing section as a display signal;

an audio data processing section for decoding the encoded audio data depending upon the reproduction mode identified by said mode discrimination data for said at least every opening of a file in said data and removing the storage medium;

an audio output section for converting the audio data from said audio processing section into an analog voice signal to output to a speaker;

data processing means for controlling said image data processing section and said audio data processing section by said processing program for said at least every opening of a file in said data and removing the storage medium;

mode discrimination means for discriminating the one of said reproduction modes on the basis of said mode discrimination data for said at least every opening of a file in said data and removing the storage medium;

mode supply means for accepting externally entered mode information identifying recording system of the one of said reproduction modes and algorithm for reproduction for said at least every opening of a file in said data and removing the storage medium;

selection means for selectively providing said mode information from said mode discrimination means and said mode supply means for said at least every opening of a file in said data and removing the storage medium;

mode selecting system means provided in said image data processing section and said audio data processing section, for selecting one of said plurality of said reproduction modes according to said mode information for said at least every opening of a file in said data and removing the storage medium; and mode control section for controlling said image data processing section and said audio data processing section based on said mode information for said at least every opening of a file in said data and removing the storage medium.

36. A multi-media reproduction processing apparatus as set forth in claim 35, wherein said image data processing section comprises, at least:

a mode dependent operation control program memory for storing a plurality of algorithms for reproduction to be selected by a mode control signal output from said mode selecting means and indicative of the reproduction mode for said at least every opening of a file in said data and removing the storage medium, a first arithmetic processing section for performing image processing converting the format corresponding to the reproduction mode having the selected algorithm for said at least every opening of a file in said data and removing the storage medium, and a video random access memory for storing image data reproduced with said algorithm.

37. A multi-media reproduction processing apparatus as set forth in claim 36, wherein said first arithmetic processing section has a plurality of arithmetic sections respectively adapted to a plurality of said reproduction modes so as to avoid the necessity of a conversion of format corresponding to selected reproduction mode having the selected algorithm.

38. A multi-media reproduction processing apparatus as set forth in claim 35, wherein said audio data processing section comprises, at least:

a mode dependent operation control program memory storing a plurality of algorithms for reproduction to be selected by the mode signal output from said mode selecting means and indicative of the reproduction mode for said at least every opening of a file in said data and removing the storage medium, a second arithmetic processing section for performing audio processing with said algorithm corresponding to said reproduction mode for said at least every opening of a file in said data and removing the storage medium, and an audio data memory for storing the audio data reproduced by said algorithm.

39. A multi-media reproduction processing apparatus as set forth in claim 35, wherein said data processing means comprises:

storage means for storing processing program to be used for reproduction process of the stream data for said at least every opening of a file in said data and removing the storage medium, discriminating means for determining whether or not the processing program is present in said storage means for said at least every opening of a file in said data and removing the storage medium, and transferring means for transferring said processing program from said data supplying means to said memory means when processing program is not present for said at least every opening of a file in said data and removing the storage medium.

40. A multi-media reproduction processing apparatus as set forth in claim 39, wherein said storage means stores the stream data.

41. A multi-media reproduction processing apparatus as set forth in claim 39, wherein said storage means is provided in said data processing means.

42. A multi-media reproduction processing apparatus as set forth in claim 41, wherein said storage means comprises a read-only memory employing a semiconductor element.

43. A multi-media reproduction processing apparatus as set forth in claim 41, wherein said memory means comprises a random access memory employing a semiconductor element.

44. A multi-media reproduction processing apparatus as set forth in claim 41, wherein said memory means comprises a cache memory.

45. A multi-media reproduction processing apparatus as set forth in claim 41, wherein said storage means is of a magnetic disk type.

46. A multi-media reproduction processing apparatus as set forth in claim 39, wherein said storage means is of a data reading and writing type.

47. A multi-media reproduction processing apparatus as set forth in claim 35, wherein the storage medium included in said data supply means comprises an external read only storage device.

48. A multi-media reproduction processing apparatus as set forth in claim 47, wherein said external read only storage device is of an optical disk type.

49. A multi-media reproduction processing apparatus as set forth in claim 35, wherein said storage medium included in said data supply means comprises an external read/write storage device.

50. A multi-media reproduction processing apparatus as set forth in claim 49, which further comprises an identification code reading means associated with said external storage medium for reading out a code identifying the type of said external storage medium.

51. A multi-media reproduction processing apparatus as set forth in claim 35, wherein said data supply means and said data processing means are connected through communication network.

52. A disc drive device, comprising:

data supply means for reading out data from a storage medium in accordance with one of a plurality of reproduction modes, describing a respective data compression algorithm and data format, and outputting said data;

data separation means for separating mode discrimination data for identifying the one of said plurality of reproduction modes from said data for at least every opening of a file in said data and removing the storage medium;

mode discrimination means for discriminating a specific reproduction mode among said plurality of said reproduction modes on the basis of said mode discrimination data and outputting a mode information identifying recording system of the specific reproduction mode and algorithm for reproduction for said at least every opening of a file in said data and removing the storage medium; and selecting means for selecting a reproduction mode to said specific reproduction mode according to said mode information for said at least every opening of a file in said data and removing the storage medium.

53. A switching device, comprising:

data supply means for reading out data from a storage medium in accordance with one of a plurality of reproduction modes, describing a respective data compression algorithm and data format, and outputting said data for at least every opening of a file in said data and removing the storage medium;

data separation means for separating mode discrimination data for identifying one of a plurality of reproduction modes from said data for said at least every opening of a file in said data and removing the storage medium;

mode discrimination means for discriminating a specific reproduction mode from among said plurality of said reproduction modes on the basis of said mode discrimination data and outputting a mode information identifying recording system of said specific reproduction mode and algorithm for reproduction for said at least every opening of a file in said data and removing the storage medium; and selecting means for selecting reproduction modes to said specific reproduction mode according to said mode information for said at least every opening of a file in said data and removing the storage medium.

54. A multi-media reproduction processing apparatus, comprising:

data supply means for reading out multi-media data containing image data, audio data and a processing program stored on a storage medium according to one of a plurality of reproduction modes, describing a respective data compression algorithm and data format, and outputting said multi-media data for at least every opening of a file in said data and removing the storage medium;

data separation means for separating respective ones of said image data, said audio data and said processing program from said multi-media data for said at least every opening of a file in said data and removing the storage medium;

an image data processing section for performing data processing for said image data with a data structure of a reproduction mode identified by mode discrimination data and generating frame data for a video image for said at least every opening of a file in said data and removing the storage medium;

an image output control section for outputting said frame data from said image data processing section to a display monitor as a display signal;

an audio data processing section for decoding a encoded audio data depending upon the reproduction mode identified by said mode discrimination data for said at least every opening of a file in said data and removing the storage medium;

an audio output section for converting an audio data from said audio data processing section into an analog voice signal to output to a speaker;

data processing means for controlling sid image data processing section and said audio data processing section with said processing program and outputting said mode discrimination signal identifying one of a plurality of reproduction modes based on said processing program for said at least every opening of a file in said data and removing the storage medium; mode selecting means provided in said image data processing section and said audio data processing section for selecting one of said plurality of reproduction modes according to said mode discrimination data for said at least every opening of a file in said data and removing the storage medium; and mode control section for controlling said image data processing section and said audio data processing section depending upon said mode discrimination data for said at least every opening of a file in said data and removing the storage medium.

55. A multi-media reproduction processing apparatus, comprising:

data supply means for supplying multi-media data;

at least one reproducing means having a plurality of reproduction modes, describing a respective data compression algorithm and data format, for reproducing data read out from a storage medium in accordance with one of said plurality of reproduction modes;

mode judgement means for determining a reproduction mode from the multi-media data, for outputting mode information indicative of a recording format and an algorithm for reproduction in the reproduction mode for said at least every opening of a file in said data and removing the storage medium; and mode selecting means provided in said reproduction means, for selecting one of said plurality of reproduction modes depending upon said mode information for said at least every opening of a file in said data and removing the storage medium.

56. A multi-media reproduction processing apparatus according to claim 55, wherein said mode selecting means includes:

reproduction mode storing means for storing at least one reproduction mode information for said at least every opening of a file in said data and removing the storage medium;

reproduction mode accepting means for accepting said at least one reproduction mode information for said at least every opening of a file in said data and removing the storage medium; and reproduction setting means for setting said at least one reproduction mode information supplied from said reproduction mode storing means to said reproduction mode accepting means for said at least every opening of a file in said data and removing the storage medium.

57. A multi-media reproduction processing apparatus, comprising:

data supply means for supplying multi-media data;

at least one processor for processing said multi-media data; and memory means connected to said processor, wherein
said processor processes a reproduction mode, describing a respective data compression algorithm and data format, judged according to mode judging data stored in said memory for at least every opening of a file in said data and removing the storage medium,
an appropriate one of said reproduction modes is selected from the plurality of reproduction modes according to a result of the determination stored in said memory means for said at least every opening of a file in said data and removing the storage medium, and
multi-media data supplied from said data supply means is reproduced in accordance with said selected reproduction mode for said at least every opening of a file in said data and removing the storage medium.

58. A multi-media reproduction processing apparatus according to claim 57, wherein said reproduction mode specifies a recording format and an algorithm for reproduction for said at least every opening of a file in said data and removing the storage medium.

* * * * *